United States Patent [19]

Eerkens

[11] 4,205,268
[45] May 27, 1980

[54] NEUTRINO COMMUNICATION ARRANGEMENT

[76] Inventor: Jozef W. Eerkens, 1342 Lachman La., Pacific Palisades, Calif. 90272

[21] Appl. No.: 764,292

[22] Filed: Jan. 31, 1977

[51] Int. Cl.² ............................................. H04B 1/00
[52] U.S. Cl. ................... 455/620; 250/251; 331/94.5 G; 375/22; 375/23; 455/615; 455/616
[58] Field of Search ............................. 325/26, 65, 28; 250/199, 251; 332/7.51; 331/94.5 G, 94.5 N

[56] References Cited

U.S. PATENT DOCUMENTS

| | | | |
|---|---|---|---|
| 3,321,714 | 5/1967 | Tien | 250/199 |
| 3,333,101 | 7/1967 | Bell | 250/199 |
| 3,457,417 | 7/1969 | Buchsbaum et al. | 331/94.5 N |
| 3,582,814 | 6/1971 | Duguay et al. | 331/94.5 N |
| 3,594,659 | 7/1971 | Brandi et al. | 250/199 |
| 3,970,936 | 7/1976 | Arnold | 250/199 |
| 4,034,226 | 7/1977 | Freund | 331/94.5 G |

OTHER PUBLICATIONS

"Telecommunication with Muon Beams", by Arnold, Science, vol. 177, pp. 163-164, Jul. 1972.
"Messages by Muons", Time, Aug. 1972, pp. 73-74.

Primary Examiner—Robert L. Richardson
Assistant Examiner—Jin F. Ng
Attorney, Agent, or Firm—Don B. Finkelstein

[57] ABSTRACT

A communication system comprising an emitter and a receiver (detector) utilizing modulated beams of neutrino and antineutrino waves as information carriers between the emitter and the receiver. Generation of modulated neutrino and antineutrino beams in the emitter is achieved by a maser-like medium, while detection and demodulation of the neutrino and antineutrino beams is accomplished by a second maser-like medium which registers the fluence (or flux) of modulated neutrinos and antineutrinos passing therethrough by means of resonant stimulated deexcitation of excited states. In addition to the information transmission utilization, the neutrino emitter and receiver (detector) system may also be employed to gather information by the probing of internal earth structures. Such structures cause measurable refractions and retardations of the propagated pulses of monochromatic coherent neutrino waves travelling through the earth between the emitter and receiver (detector), at certain predetermined neutrino frequencies.

56 Claims, 19 Drawing Figures

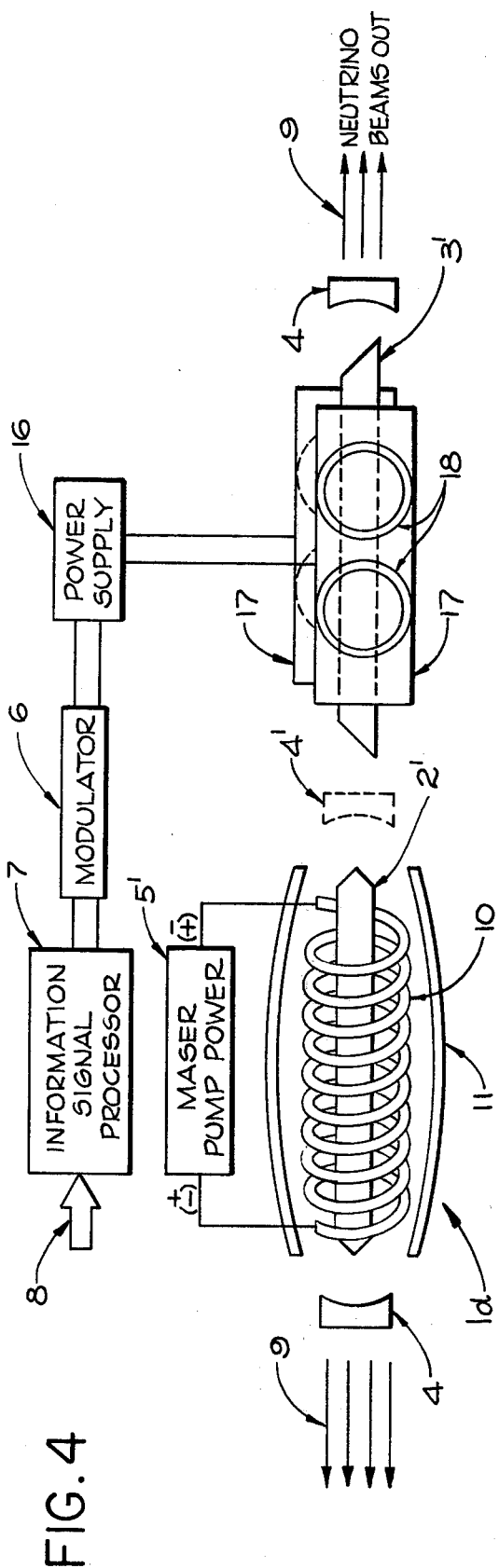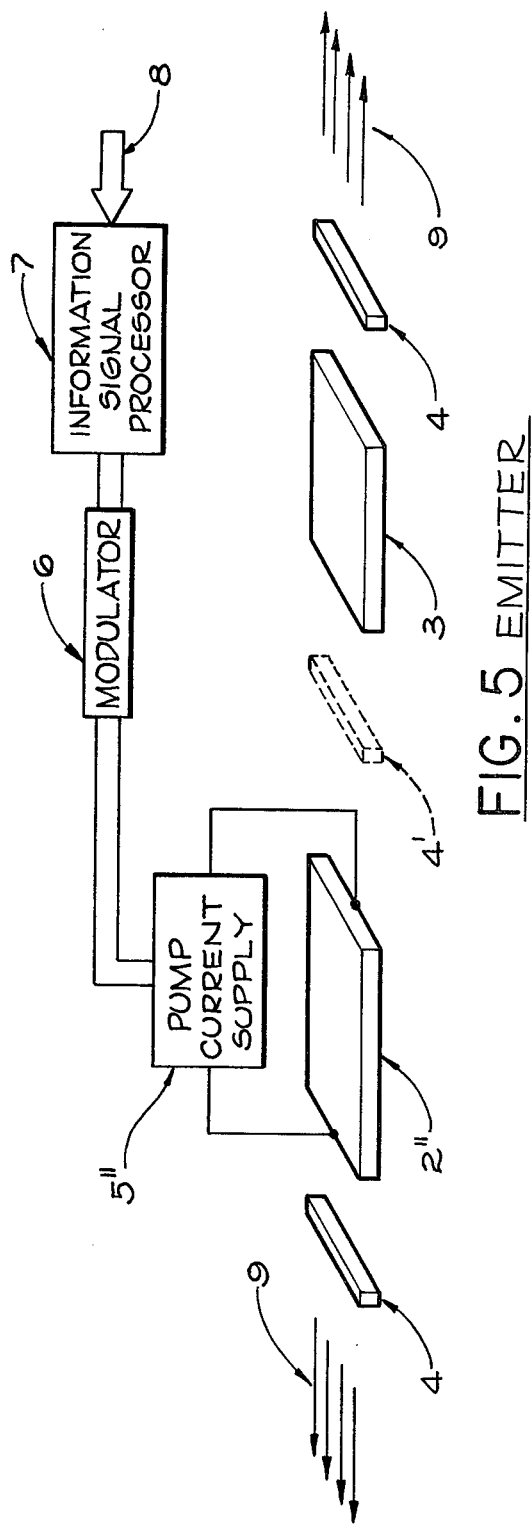
FIG. 4
FIG. 5 EMITTER

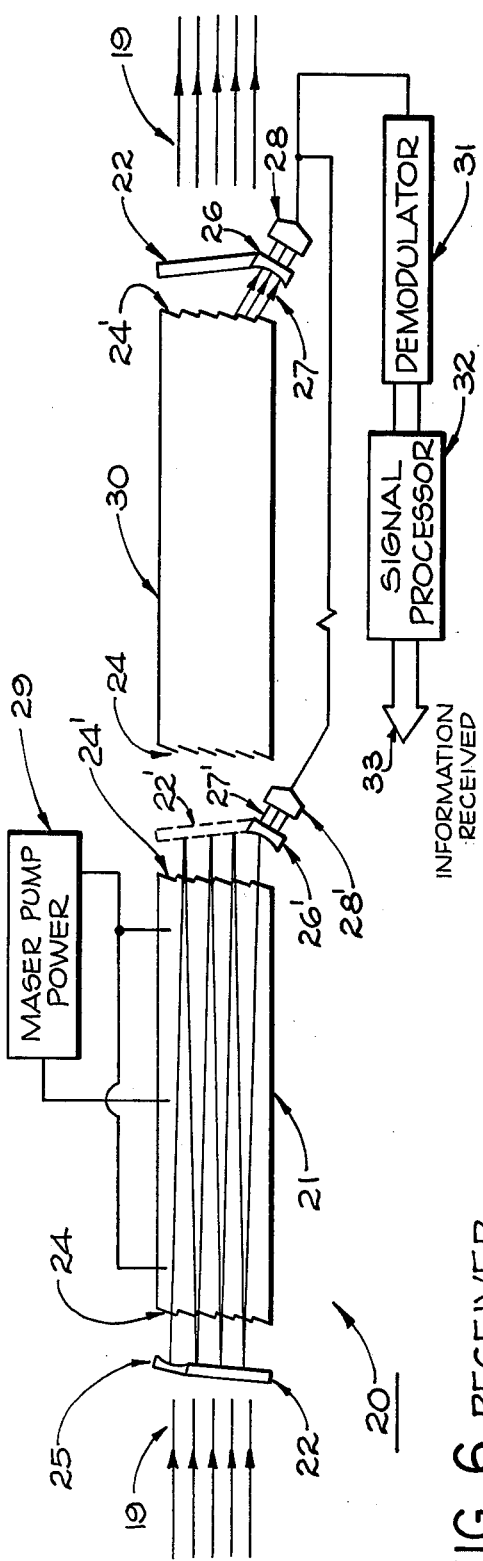
FIG. 6 RECEIVER
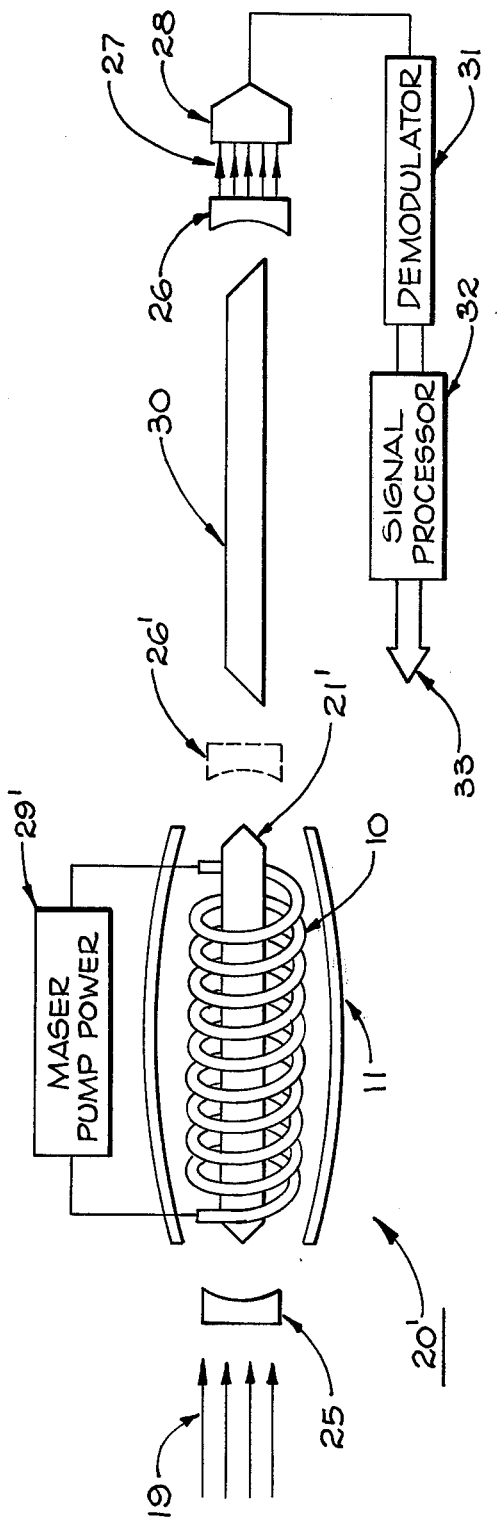
FIG. 7 RECEIVER

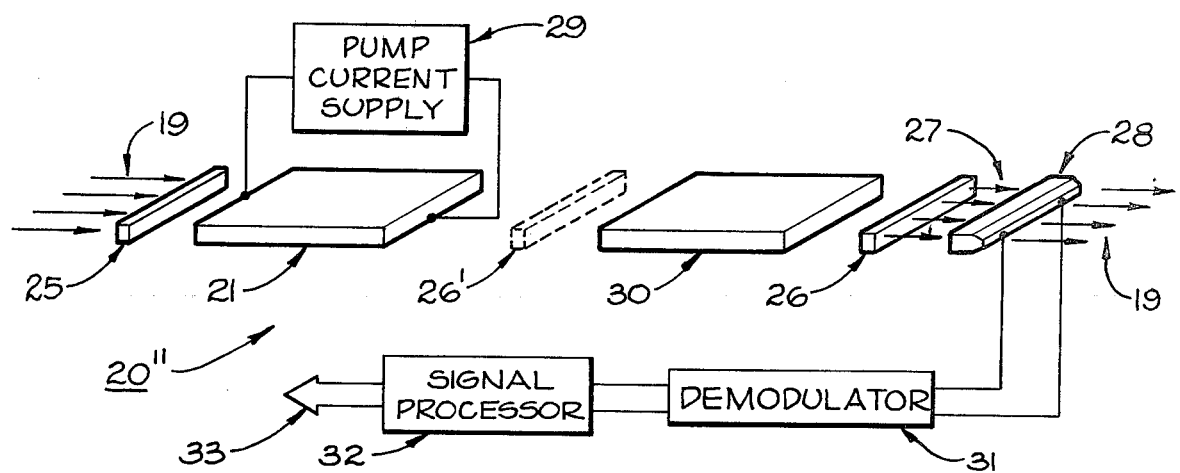
FIG. 8 RECEIVER
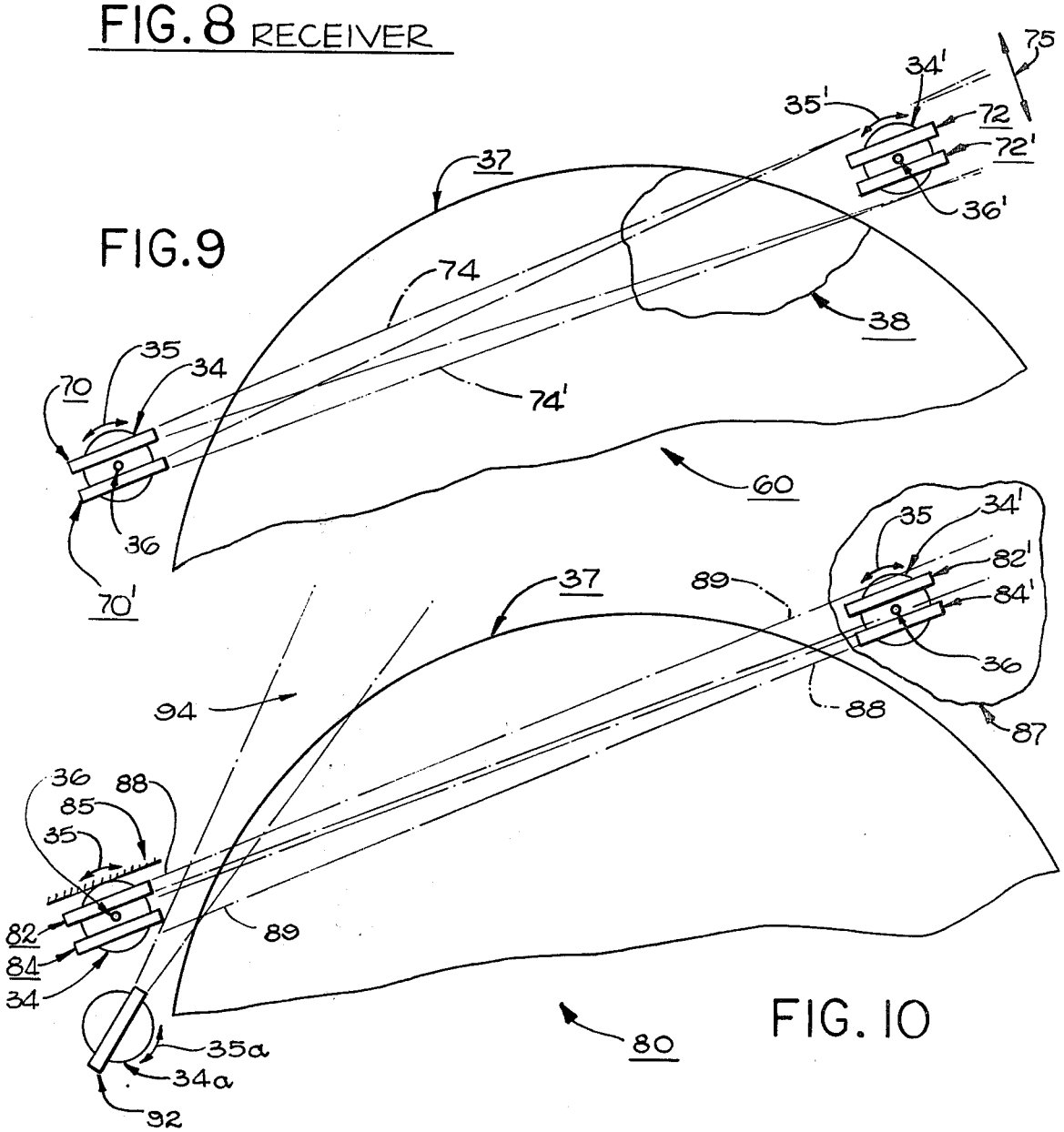
FIG. 9
FIG. 10

42: $E_\gamma = E_\nu = E_{\tilde{\nu}} = E_k - E_n = E_a - E_c$
    $E_b - E_c = E_m - E_n$ 43: $E_k - E_n \neq \pm(E_m - E_n)$
    $E_m \neq E_n \; ; \; E_m \neq E_k$ 44: $\underrightarrow{\gamma} + X^*(E_k) \rightarrow X(E_n) + \underrightarrow{\nu} + \underrightarrow{\tilde{\nu}}$
45: $\underrightarrow{\nu} + X^*(E_k) \rightarrow X(E_n) + \underrightarrow{\nu} + \underrightarrow{\gamma}$
46: $\underrightarrow{\tilde{\nu}} + X^*(E_k) \rightarrow X(E_n) + \underrightarrow{\tilde{\nu}} + \underrightarrow{\gamma}$

42: $E_\gamma = E_\nu = E_{\tilde{\nu}} = E_k - E_n$

43: $E_k - E_n = E_m - E_k = E_b - E_a = E_a - E_c$

44: $\underrightarrow{\gamma} + X^*(E_k) \rightarrow X(E_n) + \underleftarrow{\nu} + \underrightarrow{\tilde{\nu}}$
45: $\underrightarrow{\nu} + X^*(E_k) \rightarrow X(E_n) + \underrightarrow{\nu} + \underrightarrow{\gamma}$
46: $\underrightarrow{\tilde{\nu}} + X^*(E_k) \rightarrow X(E_n) + \underrightarrow{\tilde{\nu}} + \underrightarrow{\gamma}$

44: $\underrightarrow{\gamma} + X^*(E_k) \rightarrow X(E_n) + \underrightarrow{\nu} + \underrightarrow{\tilde{\nu}}$
45: $\underrightarrow{\nu} + X^*(E_k) \rightarrow X(E_n) + \underrightarrow{\nu} + \underrightarrow{\gamma}$
46: $\underrightarrow{\tilde{\nu}} + X^*(E_k) \rightarrow X(E_n) + \underrightarrow{\tilde{\nu}} + \underrightarrow{\gamma}$ 48: $E_m \approx E_k \; ; \; E_a \approx E_b$ 42: $E_\gamma = E_\nu = E_{\tilde{\nu}} = E_k - E_n = E_a - E_c$

44: $\underrightarrow{\gamma} + X^*(E_k) \rightarrow X(E_n) + \underleftarrow{\nu} + \underrightarrow{\tilde{\nu}}$
45: $\underrightarrow{\nu} + X^*(E_k) \rightarrow X(E_n) + \underrightarrow{\nu} + \underrightarrow{\gamma}$
46: $\underrightarrow{\tilde{\nu}} + X^*(E_k) \rightarrow X(E_n) + \underrightarrow{\tilde{\nu}} + \underrightarrow{\gamma}$ 49: $E_m \approx E_n \; ; \; E_b \approx E_c$ 42: $E_\gamma = E_\nu = E_{\tilde{\nu}} = E_k - E_n = E_a - E_c$ $E_a$ —⌒41  40⌐— $E_k$ $E_c$ ——  —— $E_n$ $E_b$ ——  —— $E_m$ 44 ⟶ $\boxed{\underset{\rightarrow}{\gamma}+X^*(E_k)\rightarrow X(E_n)+\underset{\leftarrow}{\nu}+\underset{\rightarrow}{\tilde{\nu}}}$ 50 ⟶ $\boxed{E_\gamma = E_n - E_m = E_c - E_b}$ 51 ⟶ $\boxed{\begin{array}{l}E_\nu = E_{\tilde{\nu}} = \tfrac{1}{2}(E_k - E_m) = \\ = \tfrac{1}{2}(E_a - E_b)\end{array}}$

44 ⟶ $\boxed{\underset{\rightarrow}{\gamma}+X^*(E_k)\rightarrow X(E_n)+\underset{\leftarrow}{\nu}+\underset{\rightarrow}{\tilde{\nu}}}$ 52 ⟶ $\boxed{E_\gamma = E_m - E_k = E_b - E_a}$ 53 ⟶ $\boxed{\begin{array}{l}E_\nu = E_{\tilde{\nu}} = \tfrac{1}{2}(E_m - E_n) = \\ = \tfrac{1}{2}(E_b - E_c)\end{array}}$

54 ⟶ $\boxed{\underset{\rightarrow}{\gamma}+X^*(E_k)\rightarrow X(E_n)+\underset{\leftarrow}{\gamma}+\underset{\rightarrow}{\nu}+\underset{\rightarrow}{\tilde{\nu}}}$ 55 ⟶ $\boxed{E_\gamma = E_m - E_n = E_b - E_c}$ 56 ⟶ $\boxed{\begin{array}{l}E_\nu = E_{\tilde{\nu}} = \tfrac{1}{2}(E_k - E_n) = \\ = \tfrac{1}{2}(E_a - E_c)\end{array}}$

45 ⟶ $\boxed{\underset{\rightarrow}{\nu}+X^*(E_k)\rightarrow X(E_n)+\underset{\rightarrow}{\nu}+\gamma}$ 46 ⟶ $\boxed{\underset{\rightarrow}{\tilde{\nu}}+X^*(E_k)\rightarrow X(E_n)+\underset{\rightarrow}{\tilde{\nu}}+\gamma}$ 57 ⟶ $\boxed{E_\gamma = E_k - E_n = E_a - E_c}$ 58 ⟶ $\boxed{\begin{array}{l}E_\nu = E_{\tilde{\nu}} = 2(E_k - E_n) = \\ = 2(E_a - E_c)\end{array}}$

FIG. 18

NEUTRINO COMMUNICATION ARRANGEMENT

BACKGROUND OF THE INVENTION

1. Field of the Invention

This invention relates to the communications art and in particular to the transfer of information by means of beams of modulated neutrino and antineutrino waves between an emitter and receiver (detector).

2. Description of the Prior Art

Since Marconi first demonstrated the feasibility of communicating with electromagnetic photons in the Kilo-Hertz frequency region, nearly all other practically accessible portions of the photon spectrum have been utilized for the transfer of information. Easily accessible frequency regions are extremely crowded at present and many inventions have been made to devise special techniques in frequency modulation, amplitude modulation, pulse-duration modulation, phase modulation, polarization modulation, and the like, to effect an increase in the capacity for the simultaneous transmission of information in these most desirable photon frequency regions.

So far only mass-less, neutral photons have been found practical for sending information over large distances. Two other known stable elementary particles found in nature, namely protons and electrons, are stopped in a very short distance in the atmosphere and have generally been proven not to be useful for wireless communications in most applications. Transmitting information by means of composites of the elementary particles, namely atoms and molecules is possible; it is equivalent to transmitting sound. However sound is attenuated relatively strongly in the atmosphere and ordinarily it is only useful for the transmission of information over medium to short distances. Neutrons which are composed of a proton and an electron might be considered for communications, but they are heavily absorbed by some nucleii in the atmosphere and decay into a proton and electron in 20 minutes. Similarly, high-energy muons or heavy electrons which are generated in particle accelerators have been suggested as possible information carriers but their high cost of production and short half-life of 2.22 microseconds, limits their usefulness rather severely.

Other than the use of the mass-less, neutral photons and soundwaves therefore, no practical wireless communication systems using other basic carriers have been developed to date.

SUMMARY OF THE INVENTION

In the present invention a new technique is described for the generation, modulation, and detection of neutrino and antineutrino beams. An entirely new wireless communication system is thereby provided which will alleviate some of the present crowding of the electromagnetic spectrum. The new system also is ideal for secure communications since, in general, it utilizes directed beams whose exact location must be known for interception. In contrast to electromagnetic communications, neutrino and antineutrino beam communications can be done through the earth from one side to the other, through bodies of water such as oceans and lakes, or the like.

Before discussing the details of the present invention, a short explanation of the basic physical concepts involved therein is presented in order to provide a better understanding of the principles of operation.

The neutrino is one of the four known stable elementary "quanticles" of physics, the other three being the proton, electron, and photon. Like the photon, it possesses no mass and is neutral. Unlike the photon, the neutrino reacts only very weakly with matter and for this reason it can traverse matter over very large distances. For the same reason however, very little is known about it. Most knowledge to date on neutrinos concerns high-energy neutrinos ($E \gtrsim 10$ keV), whereas in the present invention most interest is in low-energy ($E \lesssim 10$ keV) neutrinos and antineutrinos.

The detection systems for neutrinos used to date have involved an absorption process which is the inverse of an emission process. Because a neutrino (or antineutrino) possesses a spin $S = \hbar/2$, these particles cannot be absorbed in the usual electronic, vibrational, or rotational transitions of atoms and molecules which require spin changes of $\Delta S = \pm 0,1$ in units of $\hbar$. (The photon possesses spin $S = 0 \pm 1$). Only in nuclear transitions is it possible to have reactions of a high-energy electron with a neutrino so that a neutrino is emitted (beta decay) or absorbed (inverse beta decay). Therefore primarily nuclear neutrinos with Mev energies emitted or absorbed by nucleii have been studied to date. Studies of such nuclear (Mev) neutrinos for communications have shown that a low information transfer bit rate (10 bits per day), would be all that could be obtained, due to the low cross-section of nuclear neutrino interactions.

In the present invention, detection of neutrinos occurs by the process of stimulated deexcitation instead of absorption and use is made of low-energy neutrinos in the peV, neV, $\mu$eV, meV, and eV energy regions. That is, neutrinos or antineutrinos whose frequencies are resonant with atomic or molecular excited states are used. These neutrinos can stimulate the deexcitation of an atomic or molecular state and the photon emitted in such a deexcitation can be detected, signaling the "fly-by" of a neutrino or antineutrino. Thus although no neutrinos or antineutrinos are absorbed and annihilated, their presence can be detected by the signatures they leave behind in a frequency-resonant medium.

Generally, electronic, vibronic, and rovibronic transitions in atoms and molecules involve energy quanta exchanges of 1 to 100 eV; vibrational and rovibrational transitions require quanta of 0.01 to 1 eV; and pure rotational transitions take energies between 1 $\mu$ev ($10^{-6}$ eV) and 10 meV ($10^{-2}$ eV) for most inorganic molecules and energies between 0.1 peV ($10^{-13}$ eV) and 1 $\mu$eV ($10^{-6}$ eV) for very large bioorganic molecules.

According to the neutrino-composed photon (NCP) theory, photons are made up of a neutrino and antineutrino with the same frequency which travel in exactly the same directions and whose spins counter-rotate. Extending the NCP concept further, there is a finite probability that, instead of emitting a photon or equivalent neutrino-antineutrino pair traveling coherently in the same direction, a neutrino and antineutrino pair is emitted in which each is traveling in an exactly opposite direction when an excited atom or molecule deexcites. For example, for a 1.8 eV transition ($\lambda = 6940$ Å), one out of every $10^{16}$ spontaneous emission events yields a neutrino-antineutrino pair traveling in opposite directions instead of a photon which is equivalent to a neutrino-antineutrino pair traveling in the same direction. Because of the low spontaneous emission probability of oppositely traveling neutrino/antineutrino pairs and the fact that eV neutrinos cannot be observed by absorption, such process have generally remained undetectable to date.

With the discovery in the 1960's that there are two neutrinos, one with left-handed spin and one with right-handed spin, a four component or dual two-component neutrino theory has emerged (for each neutrino there is a corresponding anti-neutrino).

Recent studies have indicated a substantiation of the neutrino theory of light based upon the four-component neutrino theory. This is shown, for example in "Neutrino Theory of Photons", W. A. Perkins, Physical Review, Vol. 137, No. 5B, page B1291 (1965), and "Statistics of a Composite Photon Formed of Two Fermions," W. A. Perkins, Physical Review D., 5, 6, 1375 (March 1972).

There are many indications in physics that all fundamental particles or "quanticles" or nature have a spin of $\frac{1}{2}$ units of $\hbar$ and since the photon has a spin of 0 or 1, it has long been suspected of actually being a composite quanticle. The fact that at high energies the photon decomposes in a Coulomb field into an electron and positron (pair production) with spins $S = \pm \frac{1}{2}$, also points to the basic composite nature of the photon.

The present invention extends the NCP phenomenon to the process of stimulated deexcitation of electronic, vibration and/or rotational excited levels of molecules and/or atoms by which it becomes possible to observe low-energy neutrinos and antineutrinos and to use them in practical communications systems.

In addition to the rare spontaneous emission event of oppositely traveling neutrino-antineutrino pairs discussed above, two other interactions of neutrinos or antineutrinos with electrons are possible which have much higher cross-sections, namely: (1) the stimulated deexcitation of an atomic or molecular excited state by a photon resulting in the generation of a neutrino-antineutrino pair traveling in opposite directions coherent with the incoming stimulating photon, and (2) the stimulated deexcitation of an excited atomic or molecular state by a neutrino or antineutrino resulting in the emission of a photon (or a neutrino-antineutrino pair traveling in the same direction according to the NCP theory). These interactions may be written in shorthand by the formulas:

$$\gamma + X^* \rightarrow X + \nu + \tilde{\nu} \quad (1a)$$

$$\gamma + X^* \rightarrow \gamma + X + \nu + \tilde{\nu} \quad (1b)$$

$$\tilde{\nu} + X^* \rightarrow \tilde{\nu} + X + \gamma \quad (2a)$$

$$\nu + X^* \rightarrow \nu + X + \gamma \quad (2b)$$

Here $\gamma$ represents a photon ($\gamma \equiv \nu\tilde{\nu}$), $\nu$ is a neutrino, $\tilde{\nu}$ is an antineutrino, X is an atom or molecule, and X* is an excited atom or molecule. The arrows under $\gamma$, $\nu$, and $\tilde{\nu}$ indicate directions of travel. An arrow pointing in the same direction on the left-hand-side and the right-hand-side of the interaction relations indicates that the quanticles (photon, neutrino or antineutrino) so labeled travel in the same direction.

No single neutrino is absorbed or emitted in the interaction relations set forth in 1a, 1b, 2a and 2b above. The laws of conservation of linear-momentum, energy, and spin cannot be simultaneously obeyed by a single neutrino in a purely absorptive interaction with matter because of the neutrino's possession of spin $S = \hbar/2$, but the interactions 1a, 1b, 2a, and 2b do not violate the fundamental conservation laws. Neutrino and antineutrino beams may also experience non-absorptive refraction and reflection in matter and they diffract in the same manner as photons.

The frequency or energy of the neutrino and the antineutrino produced in interactions 1a and 1b may be equal or unequal depending on the maser medium and the nature of the masable atoms or molecules X that are used. However, the most efficient and most useful process appears to be the one in which the frequencies of the neutrino and antineutrino are equal.

In the present invention, the generation of monochromatic, spatially coherent neutrinos and antineutrinos in the emitter is achieved by process 1a or 1b using a raser, maser, laser, or graser medium (gaseous, solid, or liquid) containing rasable, masable, lasable or grasable molecular species X*. For convenience, as utilized herein, the word "maser" is utilized generally to denote any of a raser, maser, laser, or graser, which are acronyms that stand, respectively, for Radiowave (1Hz–100 MHz), Microwave (100 MHz–1THz), Light (1THz–$10^6$THz), and Gamma-Ray ($10^6$–$10^9$ THz) Amplication by Stimulated Emission of Radiation.

Mirrors with a reflectivity approaching 100 percent (at the maser photon frequency) are placed at the ends of an emitter maser cavity containing excited molecules X* in order to build up a high internal standing wave flux of maser photons inside the cavity. (For lasers and microwave masers ordinary mirrors are used, but for grasers a large ring-like cavity is utilized, and for rasers an antenna-like structure must be utilized to maintain the standing-wave). As utilized hereinafter, the word "mirror" denotes the particular structure required to provide the maintenance of the high internal standing wave flux of photons in the cavity. The high internal maser photon flux will deexcite excited species X* by stimulated emission causing, in most masable media, the emission of a second maser photon in the majority of the emissions, but there is also generated a neutrino-antineutrino pair according to process 1a and 1b in some emissions. In certain masable materials, at transition energies on the order of 1eV for example, one in $10^6$ to one in 10 stimulated emissions can result in the emission of a neutrino-antineutrino pair instead of the usual maser photon. The exact efficiency of neutrino-antineutrino pair production depends largely on the intensity of the internal standing-wave maser flux. A "neutrino-antineutrino pair" or simply a "neutrino pair" is defined herein to be an abbreviation of an "oppositely traveling (or contra-traveling) neutrino-antineutrino pair". A "cotraveling neutrino-antineutrino pair" is equivalent to a photon.

The neutrino-antineutrino pair production can be achieved by process (1a) in a maser medium containing, for example, an upper atomic or molecular energy level $E_m$, an intermediate level $E_k$, and a lower atomic or molecular energy level $E_n$, such that $E_k$ is half-way between levels $E_m$ and $E_n$ or:

$$E_k = \tfrac{1}{2}(E_m + E_n) \quad (3)$$

In some applications it is more convenient to place two separate structures inside a maser resonator cavity, namely an emitter masing medium with two maser levels $E_k$ and $E_n$ in a first structure, and a second structure aligned with the first structure that contains an emitter converter medium with three energy levels $E_a$, $E_b$ and $E_c$ wherein:

$$E_a - E_b = E_b - E_c = E_k - E_n \qquad (4)$$

The emitter maser medium with levels $E_k$ and $E_n$ is mased between $E_k$ and $E_n$, and pumps the emitter converter medium to level $E_b$ in the arrangement. With the emitter converter medium pumped to level $E_b$ (not to $E_a$), masing photons with energy $E_\gamma = \hbar\omega_\gamma = E_k - E_n$ will then cause stimulated deexcitation and the emission of neutrino-antineutrino pairs in the emitter converter medium with energies $E_\nu = E_{\bar{\nu}} = \frac{1}{2}\hbar\omega_\nu = \frac{1}{2}\hbar\omega_{\bar{\nu}} = E_b - E_a = E_k - E_n$.

To prevent pumping of level $E_a$ (or $E_m$), a first-order photon transition between $E_a$ and $E_b$ (or $E_m$ and $E_K$) must be first-order forbidden in the medium chosen.

The optically aligned emitter maser and converter medium are usually both placed inside one resonator cavity, that is, between two resonator mirrors, but in some applications a third intermediate partial photon-transmitting mirror may be placed between the maser and converter media which couples the two and allows better control over the maser portion of the two-body structure.

Usually media which are suitable for masers are also suitable for converters and therefore a suitable material can be chosen for either the maser or the converter from the large class of gaseous, liquid, and solid maser media. Some additional materials exists which are suitable as a converter medium but not as a maser medium however. In some applications the maser and converter media may be one and the same, in two separate or one single structure, while in other applications the maser and converter media are different materials in two separate structures or blended together in one structure.

Neutrino pair production can also be generated by maser media with energy level separations other than the one described above. For example, the level $E_m$ may lie intermediate between the maser levels $E_k$ and $E_n$. The output of contratraveling neutrino pair production is always one order of magnitude smaller than the corresponding intensity of photon (co-traveling neutrino pair) production, since it involves at least three (five, seven, ...) energy levels in place of the photon's two levels.

As mentioned, in some masing media the neutrino and antineutrino may have different frequencies while in others the frequency will be the same. However media where neutrino pairs are produced by stimulated emission in a standing wave of maser photons, the direction of travel of the neutrinos and antineutrinos will be parallel and antiparallel to the axis of the maser cavity or to a line at a certain angle to this axis. Thus a directional coherent beam of monochromatic neutrinos and antineutrinos is produced in the emitter.

To achieve the highest possible neutrino or antineutrino beam intensity, the emitter maser may be pulse-pumped, causing ultra-high internal masing photon fluxes for short periods of time. Information is impressed upon the outgoing neutrino and antineutrino beams by pulse-duration modulation, amplitude modulation, frequency modulation, phase-modulation, polarization modulation, or any other well-known modulation technique used in wireless communication systems. The information modulation may be impressed on the electron-pumping or flashpump pumping discharge circuitry, or it may be imposed by maser mirror alignment-misalignment modulations or by internally placed modulated quarter-wave plates which in turn will modulate the internal maser standing wave intensity. The emitted neutrino beam intensity in turn will be modulated according to the maser's internal standing wave modulation.

The beam emitted by the emitter contains in general an equal amount of neutrinos and antineutrinos traveling in the same direction. However these beams of neutrinos and antineutrinos are in general not coherent with respect to each other, that is a neutrino traveling alongside an antineutrino did not originate at the same point in space and time. Therefore, as utilized herein, when referring to "the neutrino beam" of the emitter, it is defined to contain both antineutrinos and neutrinos.

To detect and demodulate the emitted neutrino beams, the interaction process (2a) or (2b) is used in a receiver. The receiver contains also an optically coupled maser and converter medium with a transition frequency that is resonant to the neutrinos and/or antineutrinos of the emitter. Again, the maser and converter media may be of the same or different materials and may be structurally separated or blended integrally inside an optical resonator cavity bounded by mirrors. One of the resonator bounding mirrors partially transmits a beam of maser photons whose intensity is continuously sensed by a photo-sensor or photon power meter. As in the emitter, the receiver converter medium must have three energy levels, $E_a$, $E_b$, $E_c$ that are resonant with the neutrino frequency, two of which have an energy difference that equals the difference between the masing levels $E_k$ and $E_n$ of the receiver maser medium. One of these two receiver converter levels, say $E_b$, is pumped by resonant receiver maser medium photons of energy $E_\gamma = E_k - E_n$ at a rate such that the population of molecules or atoms of the receiver converter medium possessing energy level $E_b$, approaches or exceeds the population of molecules or atoms possessing lower energy level $E_c$. When a neutrino beam passes through the receiver cavity, the resonant neutrinos and/or antineutrinos will increase the deexcitation rate of the states $E_b$ in accordance with their modulation resulting in modulated disturbances of the steady-state maser photon flux in the receiver. By recording and decoding the modulated masing photon intensity with the photo-sensor, the information can then be retrieved.

The neutrinos and antineutrinos are not absorbed in the receiver and only secondarily induce the deexcitation of masable states $E_b$ whose decrease in population has a strong, negative amplifying effect on the maser photon flux. The resulting variations in maser photon flux follow the original neutrino beam modulation. The transmission of maser photons through one of the resonator end-mirrors is usually kept low, for example 1%, since under that condition, the maser is operating near threshold causing the receiver to be most sensitive to any resonant neutrino beams. The maser medium in the receiver is operated to continually pump the receiver converter medium to the desired energy level $E_b$ which continually consumes a certain fraction of the maser photons that bounce back and forth between the resonator mirrors through the receiver maser and receiver converter media. When the steady-state population of molecules pumped to level $E_b$ is disturbed, the steady-state maser photon flux in the receiver will be correspondingly disturbed.

Care must be taken that the maser and converter media of the receiver are well shielded from any stray photons to which they are resonant and only respond to resonant neutrinos. This can be accomplished, for example, by placing the receiver in a light-tight box.

A typical integrally blended receiver maser converter medium might have three equally spaced levels $E_m$, $E_k$, $E_n$, where for example $E_k = \frac{1}{2}(E_m + E_n)$, with masing action occuring between levels $E_k$ and $E_n$. The level $E_k$ is identical to the neutrino sensitive level $E_b$ in this case. The level $E_m$ must not be connected to $E_k$ and $E_n$ by first-order allowed optical transitions. For a separated receiver maser medium and converter medium arrangement, the two media must be optically aligned one after the other inside a resonator cavity bounded by two end mirrors, with a third coupling mirror between the maser and converter media to improve the control and the responsivity of the receiver. Here the maser medium would be masing between two levels $E_k$ and $E_n$ and the converter medium would have three levels $E_a > E_b > E_c$, with $E_a - E_b = E_b - E_c = E_k - E_n$, and $E_a$ optically not connected to $E_b$ and $E_c$. In these arrangements neutrinos (or antineutrinos) with energy $E_\nu = \frac{1}{2}\hbar\omega_\nu = E_k = E_k - E_n = E_b - E_c$ will stimulate the deexcitation of molecules pumped to level $E_b$ (or $E_k$ if a one-medium receiver is used), with the emission of a photon of energy $E_\gamma = E_b - E_c = E_k - E_n$. The modulated neutrino-stimulated deexcitations of levels $E_b$ cause then modulated perturbations in the maser photon flux of the receiver which are recorded by a photosensor and are subsequently decoded for information retrieval.

Other three-level arrangements with non-equally-spaced energy states may in general also be used in the receiver or emitter. The probability or cross-section for generating the neutrino-antineutrino pair by processes 1a, 1b, 2a, and 2b can be calculated by minor changes in the well-known single-event two-photon and three-photon transition relations where the transition occurs from an initial energy state to a final energy state via one or more intermediate states, as discussed, for example in "The Quantum Theory of Radiation", W. Heitler, 3rd Ed., Oxford Press, 1954, and in "Quantum Electronics", A Yariv, John Wiley & Sons, 1967. According to the neutrino theory of photons, electromagnetic neutrino waves with left-handed and right-handed helicities and spin $S = h/2$ can just as easily exist in the general radiation field as photons with spin $S = 0, \pm 1$. However the neutrino and antineutrino waves can only interact with matter via a single-event two-step (three levels) or higher multi-step (five, seven, etc. levels) transition. A single-event two-step transition is generally weaker than a single-event one-step transition.

Photons can on the other hand interact by a one-step (two-level) transition in matter and for this reason the much weaker two-step (three-level) interactive transitions of neutrinos and antineutrinos with matter have remained unnoticed to date. In the neutrino case, the interactive medium must further exist in an excited state for any interactions to be practically observable. Only if one neutrino and one antineutrino of exactly the same frequency would arrive at a molecule at exactly the same time from exactly opposite directions, could a neutrino-antineutrino pair be absorbed. The probability for such an event to actually occur in nature is extremely small. Similarly the probability for spontaneous emission of a contra-traveling neutrino-antineutrino pair is extremely low. For example with a transition energy of about 1 eV, this probability is about $10^{-16}$ compared to the spontaneous emission of a photon. It is not too surprising, therefore, that such small effects in spontaneous emission and absorption cannot and have not been detected. Only with media whose energy levels are pumped (as in masers) does it become feasible to observe non-absorptive interactions with neutrinos and antineutrinos by the mechanism of stimulated deexcitation.

Utilizing the modulated coherent beams of neutrinos and antineutrinos generated by the emitter and detected by the receiver subsystems described above, a communication system results which can transmit messages, video and other information by a wireless link through the earth or through oceans. Because neutrino beams of frequencies corresponding to resonant levels of the earth's and ocean's molecules may be refracted (but not absorbed), another application of a system comprising the emitter and receiver described above would be to probe the inner structures of the earth and to explore for ore bodies and other natural resources. Inhomogeneities in the earth due to concentrations of special materials will cause refraction and an increased traverse time for resonant neutrino beams. To measure the time delays for a beam that traverses through an ore body, one may use for example two neutrino beams of different frequency, one which is resonant to the atomic or molecular levels of the ore body and another one which is far from resonance. By pulsing two such emitters simultaneously and scanning over the ore body, the difference in arrival time at two corresponding adjacent receivers can be measured and the extent of the ore body can be deduced.

For communication of information through the earth, there is preferably selected a neutrino frequency which is not resonant or least resonant with earth materials to prevent refraction, whereas for internal earth mapping the opposite would be the case, namely neutrino frequencies which experience strong refraction would be most desirable.

The neutrino beam emitter and receiver described may thus be utilized to gather information on the earth internal composition, as well as to transmit information. It is clear that many other valuable applications utilizing coherent monochromatic neutrino beams can be envisioned for the technologies and sciences (e.g., astronomy) and it is appreciated that the same equipments described in this invention may be used in these applications.

BRIEF DESCRIPTION OF THE DRAWINGS

The above and other embodiments of the present invention may be more fully understood from the following detailed description and the accompanying drawings wherein similar reference characters refer to similar elements throughout and in which:

FIG. 4 is a schematic diagram of still another embodiment of an emitter of the present invention;

FIG. 5 is a schematic diagram of still another embodiment of an emitter of the present invention;

FIG. 6 is a schematic diagram of one embodiment of a receiver of the present invention to detect a coherent beam of neutrinos and antineutrinos;

FIG. 7 is a schematic diagram of another embodiment of a receiver of the present invention;

FIG. 8 is a schematic diagram of still another embodiment of a receiver of the present invention;

FIG. 9 is a schematic diagram showing one application of an emitter and receiver system associated with the present invention;

FIG. 10 is a schematic diagram showing another application for an emitter and receiver system associated with the present invention;

FIG. 11 is a graphical representation of some physical characteristics of the emitter and receiver media associated with the present invention;

FIG. 12 is another graphical representation of some physical characteristics of the emitter and receiver media associated with the present invention;

FIG. 13 is yet another graphical representation of some physical characteristics of the emitter and receiver media associated with the present invention;

FIG. 14 is yet another graphical representation of some physical characteristics of the emitter and receiver media associated with the present invention;

FIG. 15 is yet another graphical representation of some physical characteristics of the emitter medium associated with the present invention;

FIG. 16 is yet another graphical representation of some physical characteristics of the emitter medium associated with the present invention;

FIG. 17 is yet another graphical representation of some physical characteristics of the emitter medium associated with the present invention; and FIG. 18 is another graphical representation of some physical chracteristics of the receiver medium associated with the present invention.

DESCRIPTION OF THE PREFERRED EMBODIMENTS

Figure 1:
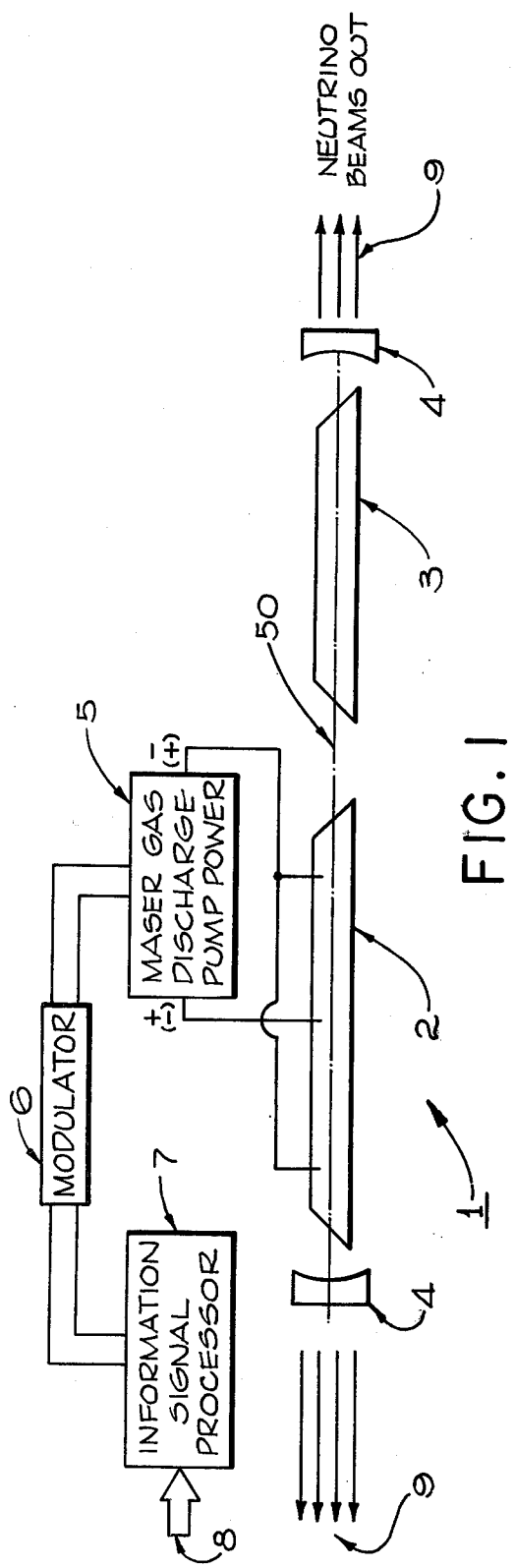
FIG. 1 is a schematic diagram of one embodiment of an emitter of the present invention for emitting a coherent beam of neutrinos and antineutrinos.

The physical processes on which the present invention is based are described above. With that description in mind, reference is made to FIG. 1 wherein there is shown a schematic diagram of one embodiment of the emitter of the present invention, generally designated 1. In the embodiment 1, there is provided a two-level maser medium generally designated 2 and a three-level conversion medium generally designated 3, which is aligned along the axis 50 of the maser medium 2. Both the maser medium 2 and the conversion medium 3 are contained within suitable containers and are placed between two maser resonator mirrors generally designated 4 whose reflectivity for the maser photons is substantially 100%.

If the two energy levels in the maser medium are designated $E_k$ and $E_n$ with $E_k$ larger than $E_n$, and if the three energy levels in the conversion medium are designated $E_a$, $E_b$, and $E_c$, with $E_a$ larger than $E_b$ and $E_b$ larger than $E_c$, then the maser medium and conversion medium are so chosen that $E_k - E_n = E_b - E_c$. Neutrino-antineutrino pairs are generated in the conversion medium 3 through the interaction of the maser photons generated in 2, with the three energy levels $E_a$, $E_b$, $E_c$ in the conversion medium 3. The neutrinos and antineutrinos are emitted as a beam, generally designated 9.

The maser medium 2 of FIG. 1 is gaseous and pumped by an electric discharge, aided, if desired, by an electron beam in pulsed applications to improve gaseous conductivity. The pump power supply for the discharge is generally designated 5 and its output current or voltage may be modulated by a modulator generally designated 6 which is controlled by the information signal processor designated 7. Information in the form of speech (sound) or video (letters, movies, television, etc.) stored on magnetic tape or optical storage structures is generally designated 8 and is fed to the signal processor 7 for transmission by the modulated neutrino beam 9. The signal-modulated pump power from the power supply 5 will modulate the maser photon wave intensity and thereby modulate the neutrino beam. Pulse-duration modulation or amplitude modulation, for example, can be employed for this purpose.

The gasous maser medium 2 may typically contain one or more of the gases listed in Tables I and II. The gases listed in Tables I, IIA and IIB are only illustrative and many other gases or gas mixtures may be used to successfully practice the invention.

TABLE I
TYPICAL MASER AND/OR CONVERTER MEDIA USING MOLECULAR GASES

| Gas | Maser Photon Wavenumber* (cm$^{-1}$) |
|---|---|
| CN | 1921–1929 |
| CO | 1500–1966 |
| NO | 1555–1710 |
| ClF | 560–700 |
| BrF | 500–630 |
| IF | —** |
| HF | 417; 460–980; 3280–3790 |
| HCl | 504–721; 2482–2700 |
| HBr | 427–515; 2152–2489 |
| HI | — |
| ArF | 51,733 |
| KrF | 40,000 |
| XeF | 28,571 |
| RnF | — |
| ArCl | — |
| KrCl | 44,863 |
| XeCl | — |
| RnCl | — |
| XeI | — |
| RnI | — |
| He$_2^+$ | — |
| Ne$_2^+$ | — |
| Ar$_2^+$ | — |
| Kr$_2^+$ | — |
| Xe$_2^+$ | — |
| Rn$_2^+$ | — |
| H$_2$,HD,D$_2$ | ~10$^{-5}$; 62,000–65,600 |
| N$_2$ | 1220–1860; 2718–2760; 2880–3035; 8100–29660 |
| O$_2$ | — |
| Cl$_2$ | — |
| Br$_2$ | — |
| I$_2$ | 7604.6 |
| HCN | 2.9; 13; 15; 18; 27; 30; 32; 47; 74; 78; 101; 139 |
| N$_2$O | — |
| H$_2$S | 44.4; 51.8; 61.6; 71.1; 96.8; 119.8; 142.4; 162.6; 165.8; 175.9; 297.2 |
| CO$_2$ | 944; 1046 |
| CS$_2$ | 866; 870 |
| COS | 1191; 1194; 1196; 1210; 1214 |
| H$_2$O | 178; 202; 206; 282; 300; 353; 357; 375; 428; 591; 1297 |
| D$_2$O | 58; 92.8; 118.6; 134; 137; 176; 275; 295 |
| NO$_2$ | 912; 925; 932; 946; 954; 960 |
| SO$_2$ | 46.5; 51.9; 66.2; 71.0 |

TABLE I-continued
TYPICAL MASER AND/OR CONVERTER MEDIA USING MOLECULAR GASES

| Gas | Maser Photon Wavenumber* (cm$^{-1}$) |
|---|---|
| NH$_3$ | 0.8; 40; 313; 401; 422; 443; 646; 676 |
| BF$_3$ | — |
| BCl$_3$ | — |
| OsO$_4$ | — |
| XeF$_4$ | — |
| CH$_3$F | 3.39; 18.5; 20.2; 22.1 |
| CH$_3$OH | 17.5; 25.5; 27; 38; 45; 59; 84 |
| C$_2$H$_3$Cl | 15.8; 19.7; 25.9 |
| CH$_3$CN | 3.33; 3.68 |
| SF$_6$ | — |
| SeF$_6$ | — |
| TeF$_6$ | — |
| MoF$_6$ | — |
| WF$_6$ | — |
| UF$_6$ | — |
| PuF$_6$ | — |
| F$_2$ | — |
| NF$_3$ | — |

*The range of a masing band of lines is indicated in some cases, while in others only a few typical lines are listed. Other nearby P and R lines can be mased.
**Indicates that precise values have not yet been established.

TABLE IIA
TYPICAL MASER AND/OR CONVERTER MEDIA UTILIZING ATOMIC IONS

| Atomic Ion Species | Maser Photon Wavenumber* (cm$^{-1}$) | Atomic Ion Species | Maser Photon Wavenumber* (cm$^{-1}$) |
|---|---|---|---|
| He-3 | 3.43 × 10$^{-6}$ | As | 16,205; 17,693; 18,188 |
| He | —** | P | 12,754; 16,426; 16,599 |
| Ne | 26,932; 30,053; 40,428 | N | 15,426; 17,618; 21,640 |
| Ar | 9,155; 20,987; 33,069 | O | 14,878; 22,640; 26,670 |
| Kr | 7,522; 20,849; 37,744 | S | 17,184; 18,420; 20,302 |
| Xe | 9,404; 17,671; 23,276 | Pb | 15,015; 17,830; 18,615 |
| Rn | — | Bi | 12,393; 13,160; 21,926 |
| Li | — | U | — |
| Na | — | F | 24,846; 31,504; 36,237 |
| K | — | Cl | 16,407; 20,970; 37,984 |
| Rb | — | Br | 16,211; 19,090; 21,085 |
| Os | — | I | 11,363; 16,477; 22,057; |
| Mg | — | | |
| Ca | 11,545; 11,707 | | |
| Sr | 9,160; 9,680 | | |
| Cu | — | | |
| Cd | 11,919; 15,736; 30,769 | | |
| Zn | 12,891; 16,386; 20,360 | | |
| Ag | — | | |
| Au | — | | |
| Hg | 6,430; 11,590; 17,612 | | |
| Se | 15,303; 19,036; 21.717 | | |

*A maximum of three typical lines are listed for species that have many lines
**Indicates that precise values have not yet been established.

TABLE IIB
TYPICAL MASER AND/OR CONVERTER MEDIA USING NEUTRAL ATOM GASES

| Atom | Maser Photon Wavenumber* (cm$^{-1}$) | Atom | Maser Photon Wavenumber* (cm$^{-1}$) |
|---|---|---|---|
| He | 46; 104; 4,847; 5,352 | Cu | 17,295; 19,586 |
| Ne | 80,312; 2,949; 15,802 | Au | 15,928 |
| Ar | 371; 1,386; 4,323; 7,423 | Cd | 6,066; 8,425; 11,919 |
| Kr | 14,168; 4,566; 12,339 | Hg | 5,516; 6,538; 14,154 |
| Xe | 132; 3,772; 11,892 | Pb | 13,833; 24,644; 27,476 |
| Rn | —** | Tl | 18,692 |
| H | 5,333 | C | 1,787; 9,353; 11,997 |
| Na | 8,786 | Si | 6,296; 8,312; 8,344 |
| K | 7,985; 8,042 | Sn | 15,200 |
| Rb | — | | |
| Cs | 1,392; 3,121 | | |
| Ca | 1,803 | | |
| Sr | 1,549 | | |
| N | 6,860; 10,646; 23,143 | | |
| O | 916; 1,458; 11,848 | | |
| S | 9,402; 9,565; 19,379 | | |
| F | 14,027; 14,207; 14,237 | | |
| Cl | 3,260; 5,062; 10,580 | | |
| Br | 3,524; 4,373; 11,840 | | |
| I | 1,109; 3,090; 10,204 | | |

*For species with many maser lines, only three typical values are listed.
**Indicates that precise values have not yet been established.

The conversion medium 3 in FIG. 1 may comprise a gas, liquid, or solid. Typical gases, liquids, or solids can be any one or more of those listed in Tables I, IIA, IIB, III, IV, and V. Many other materials may also be successfully used as converters, however; those listed in Tables I, IIA, IIB, III, IV and B are only illustrative.

It will be appreciated that the solid materials listed in the Tables are comprised of an active agent in a host material. The active agent is the material undergoing the physical transitions described herein.

TABLE III
TYPICAL MASER AND/OR CONVERTER MEDIA EMPLOYING AN ACTIVE ION IN A SOLID GLASS OR CRYSTALLINE HOST

| Active Species | Maser Photon Wavenumber (cm$^{-1}$) | Active Species | Maser Photon Wavenumber (cm$^{-1}$) |
|---|---|---|---|
| Ni | 5,157–6,161 | Pr | 9,553 |
| Co | 4,619–5,714 | Sm | 13,717–14,114 |
| Cr (Ruby) | 14,203–14,432 | Eu | 16,147–16,358 |
| Nd:Glass | 7,467–9,644 | Ho | 4,697–4,923; 18,142 |
| Nd:YAG | 7,467–9,644 | Er | 3,717; 5,793–6,536; 11,826–11,699 |
| Dy | 4227–4240 | Yb | 9,675–9,713 |
| Tm | 4953–5,319; 8,961 | U | 3,827–4,155 |

TABLE IV
TYPICAL SEMICONDUCTOR MASER AND/OR CONVERTER MEDIA

| Compound | Maser Photon Wavenumber (cm$^{-1}$) | Compound | Maser Photon Wavenumber (cm$^{-1}$) |
|---|---|---|---|
| GaAs(N-type) | 0.17; 0.35; 1.23 | GaAs$_x$P$_{1-x}$ | 11,111–16,393 |
| GaAs | 10,989–12,048 | GaSb$_x$As$_{1-x}$ | 6,667–10,526 |
| GaSe | 16,949 | GaIn$_x$P$_{1-x}$ | —** |
| GaSb | 6,452 | PbSe$_x$S$_{1-x}$ | 1,176–2,564 |
| InP | 10,989 | SCd$_x$Zn$_{1-x}$ | 20,408–31,250 |
| InAs | 3,226 | AsGa$_x$Al$_{1-x}$ | 11,111–15,873 |
| InSb | 1,923 | AsGa$_x$In$_{1-x}$ | 3,226–17,241 |
| PbS | 2,326 | InP$_x$As$_{1-x}$ | 3,125–11,111 |
| PbTe | 1,538 | InSb$_x$As$_{1-x}$ | 1,852–3,226 |
| PbSe | 1,176 | TeHg$_x$Cd$_{1-x}$ | 667–3,333 |
| CdTe | 12,739 | CdS$_x$Se$_{1-x}$ | 14,706–20,408 |
| CdSe | 14,815 | CdSnP$_2$ | 9,901 |
| CdS | 20,408 | Cd$_3$P$_2$ | 4,762 |
| ZnS | 30,303 | PbSnTe | 357 |
| ZnO | 27,027 | PbSnSe | 320–1250 |
| ZnSe | 21,739 | Te | 2,688 |
| ZnTe | 18,868 | | |

**Indicates that precise values have not yet been established.

TABLE V
TYPICAL THREE-LEVEL CONVERTER MEDIA

| Compound | Fundamental Vibrational Energy (cm$^{-1}$) |
| --- | --- |
| A. LIQUIDS | |
| Bromoform | 222 |
| Tetrachloroethylene | 447 |
| Carbon Tetrachloride | 460 |
| Ethyl Iodide | 497 |
| Hexafluorobenzene | 515 |
| Bromoform | 539 |
| Carbon Disulfide | 656 |
| Chloroform | 667 |
| Dioxane | 836 |
| Nitromethane | 927 |
| Benzene | 992 |
| Chlorobenzene | 1001 |
| Toluene | 1004 |
| Fluorobenzene | 1012 |
| Iodobenzene | 1070 |
| Nitrobenzene | 1344 |
| Quinoline | 1427 |
| Furan | 1522 |
| Styrene | 1629 |
| Pentadiene | 1655 |
| Isoprene | 1792 |
| Acetonitrile | 2250 |
| Methanol | 2831 |
| Cyclohexane | 2852 |
| Acetone | 2921 |
| Ethanol | 2921 |
| Dioxane | 2967 |
| Cyclohexanol | 2982 |
| P-Chlorotoluene | 2982 |
| o-Xylene | 2992 |
| Cyclohexane | 3038 |
| Benzene | 3064 |
| 1-Fluoro, 2-Chlorobenzene | 3084 |
| Turpentine | 3090 |
| Acetic Acid | 3162 |
| Aniline | 3300 |
| Water | 3651 |
| B. SOLIDS | |
| Quartz | 128; 466 |
| Lithium Niobate | 152; 298; 628 |
| α-Sulfur | 216; 470 |
| Calcium Tungstate | 911 |
| Stilbene | 997; 1591 |
| Polystyrene | 1001; 3054 |
| Calcite | 1084 |
| Diamond | 1332 |
| Naphthalene | 1380 |
| Triglycine Sulphate | 2422; 2702; 3022 |
| C. GASES | |
| Oxygen (O$_2$) | 1552 |
| Potassium Vapor (K) | 2721 |
| Methane (CH$_4$) | 2916 |
| Deaterium (D$_2$) | 2991 |
| Hydrogen (H$_2$) | 4155 |

Figure 1A:
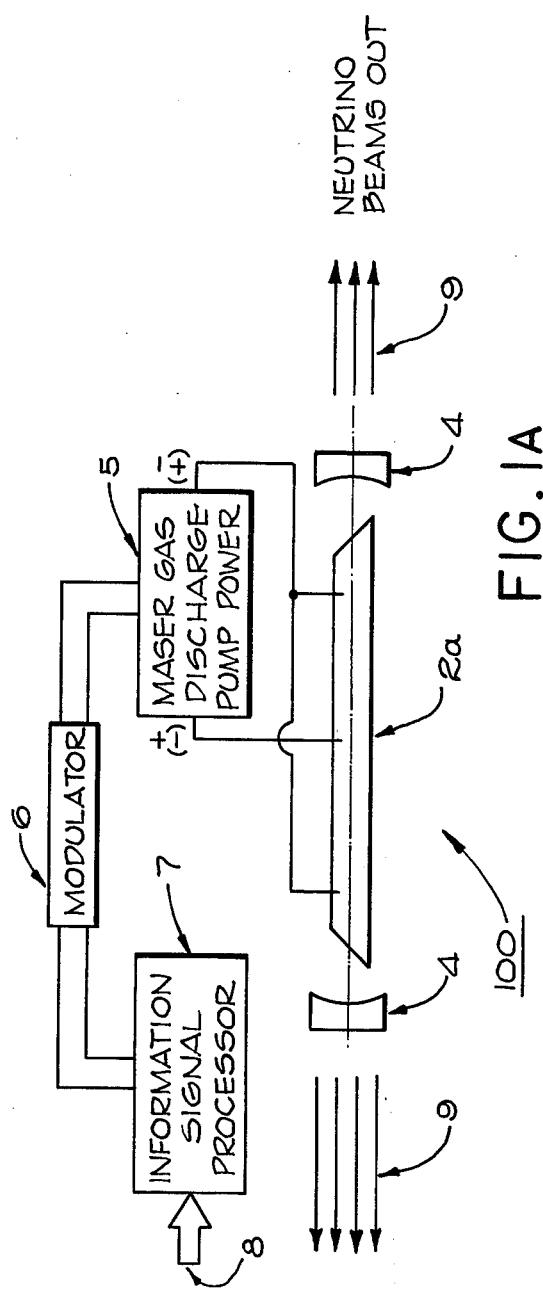
FIG. 1A is a schematic diagram of another embodiment of an emitter of the present invention.

Instead of a separate maser medium 2 and a separate conversion medium 3, as shown in FIG. 1, in some embodiments of the present invention a single medium may be used which serves both as maser and converter. FIG. 1A illustrates an embodiment, generally designated 100 in which a single medium 2a is utilized to generate the beam of neutrinos and antineutrinos. The medium 2a has three energy levels: $E_m$, $E_k$, and $E_n$. The maser photons are generated between levels $E_k$ and $E_n$ and neutrino pair production is generated by the interaction of the maser photons with the levels $E_m$, $E_k$, and $E_n$ where level $E_k$ is pumped and populated at a higher density then the lowest level $E_n$. In this alternative embodiment, the conversion medium 3 can be omitted from the embodiment 1 of FIG. 1, and the maser resonator mirror 4 is placed at the end of medium 2a, as shown in FIG. 1A. It will be appreciated that the pumping and modulation arrangement shown in FIG. 1 may also be utilized, as shown, in embodiment 100 of FIG. 1A. Similarly, the single medium 2a shown in FIG. 1A may also be utilized in place of the combined medium 2 and conversion medium 3 shown in the other embodiments of a neutrino beam generator as described below in connection with FIGS. 2, 3, 4, and 5.

Figure 2:
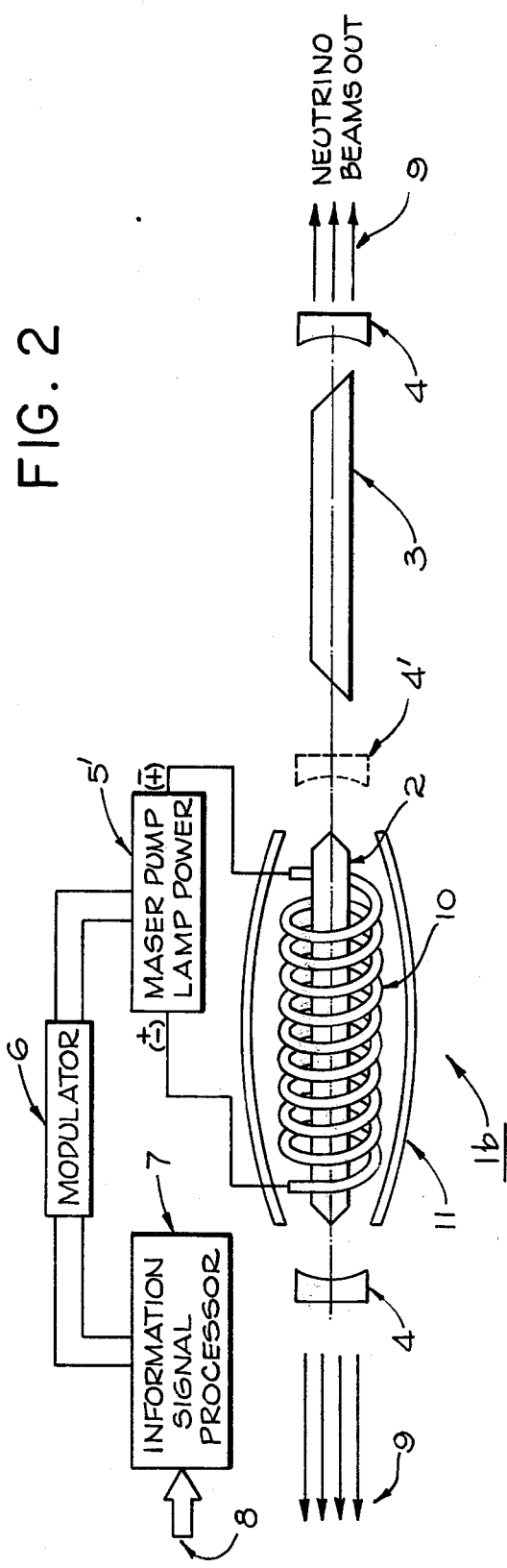
FIG. 2 is a schematic diagram of another embodiment of an emitter of the present invention.

FIG. 2 shows another embodiment 1a of a neutrino beam emitter of the present invention in which the maser medium is a solid or liquid generally designated by 10, enclosed by an elliptical specular reflector generally designated by 11 which reflects substantially all the pumping light and thus traps most of the pump light and directs it onto the maser medium. The power for the pump lamp 11 is supplied by a power supply designated 5' whose current or voltage output is controlled and modulatable by the modulator 6. The remaining components of the system are the same as those in FIG. 1.

In some embodiments, in a manner similar to that discussed above in connection with FIG. 1A, the conversion medium 3 of FIG. 2 may be omitted, in which case the medium 2' has masing levels $E_k$ and $E_n$ as well as a third level $E_m$ to effect conversion to neutrinos and antineutrinos. The resonator mirror, in such an embodiment is positioned at the location indicated at 4'.

The medium 2' could be any one of the solids listed in Table III. The examples listed in Table III are only illustrative and many other solid or liquid active-ion host maser media may be used.

Figure 3:
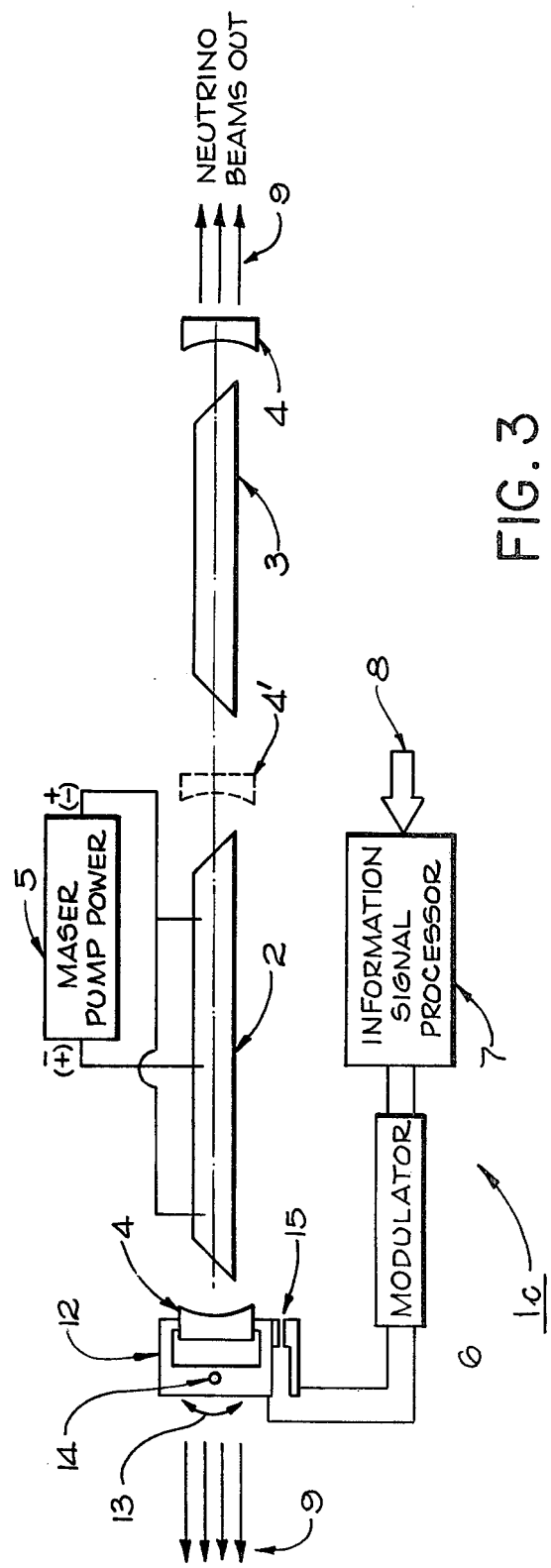
FIG. 3 is a schematic diagram of still another embodiment of an emitter of the present invention.

FIG. 3 illustrates still another embodiment of a coherent neutrino beam emitter of the present invention in which modulation is imposed on the internal maser photon wave and thence on the emitted neutrino beam by means of rocking or oscillation of one of the maser mirrors 4 with a micro-adjustable mirror holder 12. As shown in FIG. 3, the mirror holder 12 may be rocked back and forth as designated by arrows 13 about a pivot designated 14 by a push-pull electromagnet designated 15 which is activated by the modulator 6. Other well-known devices such as piezoelectric vibrators may be used instead however to vibrate or oscillate one of the maser mirrors 4 such that the maser resonator goes out and into resonance, thereby modulating the maser photon standing wave and thereby the emitted neutrino beam. The remaining components of the system of FIG. 3 are the same as in FIG. 1.

In FIG. 4 still another means for imposing modulation on the emitted neutrino beam is shown in still another embodiment 1d of the present invention. In this embodiment 1d a modulated electric field is applied to the converter medium 3' which causes the difference between levels $E_b$ and $E_c$ to vary slightly due to the Stark Effect. The electric field is placed on two capacitor plates designated 17 between which the converter medium 3' is placed. Instead of a modulated electric field, a modulated magnetic field may be imposed across the medium 3' by means of electromagnets designated 18. Power for the electric or magnetic field is supplied by power supply 16, while modulation of the electric field is controlled by modulator 6 which receives its instructions from processor 7, as described above. By this Stark or Zeeman modulation of the energy levels, the precise maser photon frequency and therefore the neutrino frequency can be frequency modulated over the width of the Zeeman or Stark Splitting.

Still another means of modulation would be to modulate a quarter-wave plate, a Pockels cell, or other well-known electro-optiz modulating device placed internally in the resonator cavity so that the standing-wave maser photons pass through it and are modulated by it.

It will be appreciated that in pulse modulation techniques which may be utilized in the present invention, pulse duration modulation as well as time duration between pulses, or a combination thereof, may be utilized as desired in particular applications.

Additionally, a pumping lamp may be utilized on liquid, solid or gas maser media in the various embodiments of the present invention, in both the emitter means and the receiver means as well as on the conversion medium where required, in order to provide pumping energy thereto. The pumping lamp may, if desired comprise a maser having the appropriate maser output characteristics.

In some embodiments of the emitter illustrated in FIG. 4, the material 3' may be chosen to possess magneto-optic or electro-optic (Kerr Effect) properties so that when the electric field is applied by means of plates 17 or the magnetic field by means of 18, the direction of polarization of the maser photons is rotated. By modulating the electric or magnetic field and by placing a polarizer plate with fixed direction of polarization in the cavity (Brewster angle surfaces on the maser medium usually provide this), the internal maser photon wave can be modulated and thus the emitted neutrino beam modulated.

FIG. 5 shows still another embodiment 1e of a neutrino beam emitter of the present invention in which the maser medium is a semiconductor diode material generally designated 2", pumped by a modulated current power supply designated 5". The semiconductor maser material may be one of those listed in Table IV, or any other semiconductor compound in which masing action can be achieved, with or without the aid of electron-beams. The remaining designated components of the emitter of FIG. 5 are essentially the same as described before.

FIG. 6 shows a schematic diagram of one embodiment of a coherent neutrino beam receiver of the present invention generally designated 20. In this embodiment 20 there is provided a two-level maser medium generally designated 21 which may be similar to the maser media 2 or 2' described above, pumped by a maser pump power supply generally designated 29, and a three-level neutrino sensor or converter medium generally designated 30 which may be similar to the conversion media 3 and 3' described above, and which is optically aligned with the maser medium 21 internal to the maser resonator cavity formed by the maser end mirrors generally designated 25 and 26. Because the materials utilized in medium 30 may be the same as those used in the emitter conversion media 3 or 3', the medium 30 is termed a converter medium. The maser mirror 25 is substantially 100% reflective for the maser photons but mirror 26 transmits partially (for example 1 to 10%) so that a maser photon output beam 27 exists whose intensity is measured and recorded by a photosensor generally designated 28.

Because an incoming coherent, modulated neutrino beam 19, which, for example, may be the beam 9 shown in FIGS. 1-5, is often spread out due to diffraction after leaving the emitter 1 and traversing distances on the order of an earth diameter, the neutrino beam intercept region is made large by making the lateral dimensions of the maser medium 21 and converter medium 30 of the receiver 20 large. In the embodiment shown in FIG. 6, this is accomplished by multiple folding of the maser photon beam path so that this beam traverses the maser medium 21 and converter medium 30 by multiple entry and exit through windows 24 and reflection from a pair of tilted mirrors designated 22 in a well-known manner. Other well-known photon beam path folding and spread techniques such as the use of White's mirrors, may also be used in place of the tilted-mirror-pair technique shown in FIG. 6. The beam path folding and spreading techniques may be utilized in any of the receiver/detector embodiments described herein as required in particular applications.

In some embodiments of the receiver 20, the three-level converter medium 30 and maser medium 21 may be combined into one medium and in this case the second of the tilted mirrors of the pair 22, as well as the maser output mirror 26, photon output 27 and photosensor 28 are positioned at the end of the combined maser and converter medium 21, as shown in FIG. 6 and designated respectively 22', 26', 27' and 28'.

The modulated neutrino beam 19 which passes through the receiver 20 will deexcite pumped excited levels in the converter medium 30 causing a modulated photon output 27 which is registered by the photosensor 28. The photosensor modulated output is decoded or demodulated in the demodulator 31 by well-known techniques and the resulting information signals are processed and recorded or transmitted by well-known methods for further use by the signal processor 32 yielding finally the decoded or demodulated information generally designated by 33.

The absorption of maser photons from maser medium 21 by the converter medium 30 pumps the converter medium 30 to an excited level which is responsive and resonant to the beam 19 of neutrinos and antineutrinos. As the beam 19 passes through the converter medium 30, it stimulates de-excitations of the pumped levels resulting in an emission of photons 27. The photon output 27 is modulated with the same modulation characteristics contained in the neutrino and antineutrino beam 19. Thus, the maser medium 21 acts as the pump to continually pump the converter medium 30 to the desired energy level.

The maser medium 21 of FIG. 6 may comprise any one or more of the gaseous maser media listed in Tables I, IIA, and IIB, while the material for the medium 30 may comprise any one or more of the materials listed in Tables I, II, III, IV, or V. The materials listed in Tables I, II, III, IV, or V are only illustrative and many other materials may be used in medium 21 and in medium 30 to practice the invention.

Thus, the receiver of the embodiment 20 senses a coherent, modulated beam 19 of neutrinos and antineutrinos and generates a detectable output signal in response thereto. The output signal generated, of course, may be comensurate with the sophistication of the modulation technique employed in the beam 19 to provide a detectable output signal having all the information contained in the beam. However, the detectable output signal generated may, in certain applications, merely indicate the presence and/or intensity of the neutrino-antineutrino beam 19 without providing the full information content thereof.

FIG. 7 shows another embodiment of a receiver 20' of the present invention in the form of a schematic diagram. In this embodiment 20' the maser medium designated 21' is a solid crystal or liquid containing maser-active ions such as the species, listed in Table III, which are pumped by a maser pump lamp 10 whose power is supplied by a power supply 29' and for which the pump light is trapped by an elliptical mirror 11 in a well-known manner. The converter medium 30 may be separate in which case it is optically aligned with the maser medium 21' in the resonator cavity bounded by end maser mirror 25 and output mirror 26, or it is incorporated in the maser medium 21' in which case the output maser mirror is positioned as designated by 26' in FIG. 7. The remaining components shown and designated in FIG. 7 are the same as described before. Of course, many other species besides those listed in Table III may be utilized in the medium 21' to practice the invention.

FIG. 8 shows yet another embodiment 20'' of a receiver of the present invention in which the maser medium designated 21'' comprises a semiconductor material illustrated by the species listed in Table IV. Many other semiconductor materials besides those listed in Table IV may be utilized of course in practicing the invention. The maser medium 21'' is pumped by a current power supply designated 29''. Again a separate converter medium 30 may be utilized as illustrated in FIG. 8 by the system using partial mirror 26 (and omitting 26') or the three-level converter medium may be incorporated in the medium 21'' as illustrated in FIG. 8 by the system with output maser mirror 26', leaving out components 26 and 30. The materials used in the converter medium 30 may be any one or more of those listed in Tables I, IIA, IIB, III, IV and V or others suitable for practicing the invention. The remaining components for modulated photon output detection 28, demodulation 31, signal processing and storage or transmission 32, yielding retrieved information 33, are the same as described before.

In FIG. 9 a schematic diagram is shown of an arrangement 60 that may be provided in one application of the present invention which utilizes two neutrino communication systems according to the present invention. In the arrangement the first neutrino communication systems comprises an emitter 70, which may be similar to the emitters 1, 1a, 1b, 1c, 1d and 1e described above and receiver 72 which may be similar to the receivers 20, 21' and 20'' described above. The emitter 70 and receiver 72 are operated such that the frequency of the emitted beam of neutrinos and antineutrinos 74 is resonant, or nearly resonant, with three energy levels of the molecules or atoms of a mineral inclusion or ore body 38 in the earth 37, thereby causing a retardation in the time of travel of the neutrino and antineutrino beam when traversing this mineral inclusion of ore body 38. A second communication system comprising an emitter 70' and receiver 72' which may be similar to the emitter 70 and receiver 72, emits a beam of neutrinos and antineutrinos 74' at a frequency different from the first system and, since the retardation time varies with frequency, there is a different retardation of the beam 74' of emitted neutrinos and antineutrinos 74' upon traversing the mineral entrapment or ore body 38, than the retardation of the resonant neutrino beam 74.

In the embodiment 60 shown in FIG. 9, the emitters 70 and 70' are mounted side by side on a turntable means generally designated 34 which can be turned in both directions as designated by the arrow 35 about a pivot 36 in the center of the turntable means 34. The two neutrino beam emitters 70 and 70' thus act as a double-barreled gun and are triggered to emit pulses of coherent neutrinos simultaneously.

Due to diffraction, the neutrino beams 74 and 74' will spread and after they have traversed a distance on the order of one earth radius they will cover the receivers 72 and 72' which are mounted side by side on a second turntable means 34' which can be turned in both directions as shown by the arrow 35' about a pivot 36'. This second turntable means 34' with the receivers 72 and 72' thereon is positioned in neutrino beam receiving relationship to the turntable means 34 having the emitters 70 and 70' thereon and oriented so that a portion of the earth 37 whose composition is to be analyzed and which may contain an ore body or mineral deposit 38, is between the emitters 70 and 70' and receiver 72 and 72'. The emitted neutrino beam 74 from emitter 70 detected by receiver 72 takes a different amount of time in traveling from emitter 70 to receiver 72 than the neutrino beam 74' emitted by emitter 70' which is detected by the receiver 72'. By measuring the difference in arrival time of the two neutrino beam 74 and 74' pulses using standard techniques, it is possible to deduce the extent of any ore body or mineral deposit 38. It will be appreciated that the frequencies of the neutrino beams 74 and 74' may be selected to provide desired time differences depending on the particular inclusion 38. That is, the beam of neutrinos 74 may arrive first at the detector 72 or the beam 74' may arrive first at the detector 72'. In general the higher the neutrino-stimulated deexcitation cross-section is of the material in the earth inclusion, the longer is the delay time in transit through the inclusion 38. Thus, the embodiment 60 may be utilized to detect the presence of the particular inclusion 38 for which the beam of neutrinos 74 is resonant. The embodiment 60 may also be utilized to determine the extent of the inclusion 38.

To scan the extent of the inclusion 38, the turntable 34 on which the emitters 70 and 70' are mounted is rotated in the direction of the arrow 35, while the receivers 72 and 72' mounted on the second turntable 34' are moved along a predetermined path as shown by arrow 75 for example by ship, automobile or aircraft. Maximum receiver signal is usually achieved when the axes of receivers 72 and 72' are aligned with the axes of the emitters 70 and 70' respectively. This may be utilized for initial acquisition and determination of the relative locations of the emitters 70 and 70' and receivers 72 and 72'.

The relative dimensions of the various components shown in FIG. 9 are exaggerated for the sake of clarity of the illustration.

FIG. 10 shows still another application of the neutrino emitter and receiver systems of the present invention. This embodiment 80 is useful for ship-to-shore, aircraft-to-tower and similar communication and/or navigation systems. In this embodiment 80, neutrino beam emitter 82 similar to the emitter 70 described above and receiver 84 similar to the neutrino beam receiver 72 described above are mounted side by side on a steerable platform or turntable 85 at a geo-stationary location 85 and a second system comprising a neutrino beam emitter 82' and receiver 84', similar to the emitter 82 and receiver 84, respectively, are mounted side by side on a platform or turntable 85' placed on, for example, a moving vehicle 87. In some embodiments the emitter 82 and receiver 84 of FIG. 10 emit and detect neutrino and antineutrino beam 88 of a first frequency while the emitter 82' and receiver 84' in FIG. 10 emit and detect a neutrino and antineutrino beam 89 at a second frequency different from the first frequency. This is to prevent interference of received neutrino modulation signals on the emitter modulation and vice versa. In other embodiments, the frequencies of the beam of neutrinos generated by the emitters 82 and 82' and received by receivers 84 and 84' may be identical, interference being avoided by using distinguishable pulse duration modulations in the beams.

In yet other arrangements of the embodiments 80 of FIG. 10, the emitter 82' and receiver 84' may be merged into one unit, the emitter 82' being usable as either an emitter or receiver by means of intermittently switching certain components such as the output maser mirror and photosensor and the modulator/demodulator circuits as required. The same unification may also be utilized in the emitter 82 and the receiver 84.

It will be appreciated, of course, that each of the neutrino-antineutrino beam emitters shown in FIGS. 9 and 10 may also incorporate the modulation structure, pumping structure and information signal processor structure described above in connection with FIGS. 1, 2, 3, 4 and 5. Similarly, the neutrino-antineutrino beam receivers shown in FIGS. 9 and 10 may also incorporate the pumping structure, demodulator and signal processor described above in connection with FIGS. 6, 7 and 8. Similarly, more or less sophisticated information signal processing and/or modulation techniques may be employed depending upon the desired application. For example, a very simple modulation technique such as ON-OFF may be all that is required in some applications. A Morse code type modulation based upon relative ON-OFF times may also be utilized as well as ultra-sophisticated encoding and decoding for source communications.

In the embodiment 80 of FIG. 10, the axes of receivers 82 and 82' are preferably long compared to their lateral widths so that both the stationary set and mobile set can sense and determine the direction of the incoming neutrino and antineutrino beams whose signals are strongest when these beams are coaxial with the receivers. By rotating the emitter and receiver set of the mobile station in two planes in a standard search pattern with the direction of one or more of the stationary emitters held fixed, the mobile station can find and lock on to a stationary emitted neutrino beam. A maximum signal will be recorded by the mobile station's receiver when the axis of the receiver is aligned with the beam from the stationary emitter.

In some applications of the embodiment 80 the stationary emitter and detector at 85 may employ, in addition to the emitter 82 and receiver 84, a second emitter 92 which emits a beam of neutrino and anti-neutrinos 94 having a frequency corresponding to the receiver 84'. The emitter 92 is mounted on a turntable 34a and may be rotated in the direction of the arrow 35a. The emitter 92 is moved to execute a predetermined search pattern and emits the modulated neutrino and anti-neutrino beam 94 having information giving the earth-fixed coordinates of the emitters of neutrino beams 88 and 94 at each instant. When this beam 94 passes over the mobile station at 87, the coded signal in the neutrino beam 94 from the emitter 92 can be recorded and interpreted by the mobile station's receiver 84' and its emitter beam 89 turned and directed at the stationary station a few instants later. After mutual lock-on, communications can be commenced between the two stations.

FIGS. 11 through 14 illustrate different possible relationships 40 and 41 for the two maser energy levels $E_k$ and $E_n$ and the three conversion or detection energy levels $E_a$, $E_b$ and $E_c$ in, respectively, the maser medium 2, 2' or 2a and the conversion medium 3 or 3' of the emitter 1, 1a, 1b, 1c, 1d, 1e or 100 and the maser medium 21, 21' or 21" and converter medium 30, of the receiver 20, 20', or 20". With the designated relationships, efficient neutrino-antineutrino pair production in the emitter 1, 1a, 1b, 1c, 1d, or 100 can be promoted according to interaction 44 shown in FIGS. 11 through 14 and efficient resonant detection of neutrinos and antineutrinos in the receiver 20, 20' or 20" occurs according to interactions 45 and 46 shown in FIGS. 11 through 14. It is assumed throughout that the upper masing level of the masable material is represented by $E_k$ and the lower masing level $E_n$.

For emitter embodiments in which the three-level conversion medium is incorporated in the maser medium of the emitter and receiver embodiments where the three-level converter medium is blended with the maser medium, the maser levels are again $E_k$ and $E_n$, and the three converter levels are $E_m$, $E_k$, and $E_n$. The difference between FIGS. 11, 12, 13, and 14 are the precise relationships between the energy levels and the energies of the maser photons, neutrinos, and antineutrinos which give efficient neutrino generation and detection. These are given by the relationships 42 and 43 for FIG. 11, relationships 42 and 47 for FIG. 12, relationships 42 and 48 for FIG. 13, and relationships 42 and 47 for FIG. 14.

Through FIGS. 11 through 14 and the following FIGS. 15 through 18, the symbols $\gamma$ and $\gamma_\Gamma$ stand for the maser photon and maser photon energy, respectively, while the symbols $\nu$, $\tilde{\nu}$, $\epsilon_\nu$, and $\epsilon_{\tilde{\nu}}$ stand respectively for a neutrino, antineutrino, neutrino energy and antineutrino energy. The symbol X refers to the masing species (atom, molecule, or ion) which may be any material listed in Table I, IIA, IIB, III, IV, or V or other compound. X(Ej) means the species X excited to energy level Ej.

FIG. 15 shows still other special relationships 50 and 51, and FIG. 16 the relations 52 and 53 for energy levels and quanticle energies that produce efficient neutrino pairs in the emitter 1, 1a, 1b, 1c, 1d, 1e, or 100 by the interaction 44.

FIG. 17 shows still another efficient neutrino pair production relationship for the emitter 1, 1a, 1b, 1c, 1d, 1e, or 100 using the interaction 54 instead of 44 and the relationships 55 and 56 for energy levels and quanticle energies.

FIG. 18 finally shows another efficient neutrino or antineutrino detection relationship using interaction 45 or 46 and the conditions 57 and 58 for energy levels and quanticle energies.

In addition to the energy level and quanticle energy relations illustrated in FIGS. 11 through 18, other relations exist which give efficient resonant neutrino pair production and neutrino/antineutrino detection under the practice of the present invention. The relationships of FIGS. 11 through 18 are only illustrative and are by no means the only relationships possible. It will be appreciated that the relationships shown in FIGS. 11–18 may be utilized in any of the neutrino beam emitters and neutrino beam receivers described above in connection with FIGS. 1–10, selected as desired for particular applications.

From the above it can be seen that the present invention not only teaches a new means for wireless communications but also structures for practicing such communications. Those skilled in the art may find variations and adaptations falling within the true scope and spirit of the present invention and all such variations and adaptations are intended to be covered by the appended claims.

I claim:

1. In a communication system, the improvement comprising:
   a first emitter means for generating a first coherent neutrino-antineutrino beam in a first direction; and
   a first receiver means aligned with said first emitter means and in neutrino-antineutrino beam receiving relationship therewith for receiving said first coherent neutrino-antineutrino beam and generating a first detectable output signal in response thereto.

2. The arrangement defined in claim 1 wherein:
   said first emitter means further comprises modulation means for modulating said coherent neutrino-antineutrino beam to impress predetermined information thereon; and
   said first receiver means further comprises a demodulation means for demodulating said neutrino-antineutrino beam and said detectable output signal contains said predetermined information.

3. The arrangement defined in claim 2 wherein:
   said modulation comprises a modulation of the class consisting of amplitude modulation, pulse duration, phase modulation, frequency modulation and polarization modulation.

4. The arrangement defined in claim 2 wherein: said emitter means further comprises:
   a pair of spaced apart resonator mirrors reflectively aligned in said first direction, an emitter maser medium intermediate said pair of spaced apart resonator mirrors for generating emitter maser photons in said first direction, and said pair of resonator mirrors substantially 100% reflective for said emitter maser photons.

5. The arrangement defined in claim 4 wherein:
   said emitter maser medium also generates said coherent neutrino-antineutrino pair beam in said first direction.

6. The arrangement defined in claim 5 wherein:
   said emitter maser medium has a plurality of at least three energy levels and said maser photons are generated between a first and a second of said energy levels and said neutrino-antineutrino pair beam is generated by the interaction of said maser photons with said at least three energy levels.

7. The arrangement defined in claim 4 wherein:
   said emitter maser medium is comprised of a semiconductor diode.

8. The arrangement defined in claim 7 wherein:
   said modulation means comprises a modulated current power supply means.

9. The arrangement defined in claim 4 wherein said modulation means further comprises:
   motion producing means connected to at least one of said pair of resonator mirrors for moving said at least one resonater mirror to provide modulation of said generated maser photons.

10. The arrangement defined in claim 4 wherein:
    said maser medium is gas; and
    an electric discharge means for generating an electric discharge in said maser medium for pumping said maser medium; and
    said maser medium generating said photons in response to said electric discharge.

11. The arrangement defined in claim 10 wherein:
    said electric discharge is pulsed; and
    an electron beam generating means for subjecting said maser medium to an electron beam during said pumping thereof.

12. The arrangement defined in claim 4 wherein:
    said emitter maser medium is one of a gas, liquid and a solid;
    pumping lamp means for generating a pumping electromagnetic radiation; and
    said emitter maser medium aligned in pumping electromagnetic radiation receiving relationship to said pumping lamp and generating said maser photons in response to receipt of said pumping electromagnetic radiation.

13. The arrangement defined in claim 12 wherein:
    said pumping lamp means is positioned adjacent to said emitter maser medium; and
    ellipitical, specular reflector means around said pumping lamp and said maser medium for directing substantially all of said pumping electromagnetic radiation onto said emitter maser medium.

14. The arrangement defined in claim 4 wherein said emitter maser medium is selected from the class consisting of:
    CO, NO, ClF, IF, BrF, HCl, HF, HBr, HI, ArF, KrF, XeF, RnF, ArCl, KrCl, XeCl, RnCl, XeI, RnI, $He_2^+$, $Ne_2^+$, $Ar_2^+$, $Kr_2^+$, $NF_3$, $Xe_2^+$, $Rn_2^+$, $H_2$, $N_2$, $O_2$, $Cl_2$, $Br_2$, $F_2$, $I_2$, $CO_2$, $CS_2$, COS, $H_2O$, $N_2O$, $NO_2$, $NH_3$, $BF_3$, $BCl_3$, $OsO_4$, $SF_6$, $MoF_6$, $WF_6$, $UF_6$, He, Ne, Ar, Kr, Xe, Rn, Li, Na, K, Rb, Cs, Mg, Ca, Sr, Cu, Ag, Au, Hg, Se, U, N, P, O, F, Cl, Br, Ni, Co, Cr, Nd, Dy, Tm, Pr, Sm, Eu, Yb, Ho, Neodymium-Yttrium-Aluminum-Garnet, Neodymium-Glass GaAs, GaSe, InSb, InP, InAs, PbSe, PbTe, GaSb, CdSe, CdS, Te, $GaAs_xP_{1-x}$, and $GaIn_xP_{1-x}$.

15. The arrangement defined in claim 4 wherein: said emitter means further comprises:
    a conversion medium intermediate said pair of spaced apart resonater mirrors and in maser photon receiving relationship to said maser medium for receiving said maser photons and generating said coherent neutrino-antineutrino pair beam in response thereto.

16. The arrangement defined in claim 15 wherein:
    said maser medium has a first energy level $E_k$ and a second energy level $E_n$ lower than $E_k$ and maser photons are generated between levels $E_k$ and $E_n$ therein; and
    said conversion medium has a first energy level $E_a$, a second energy level $E_b$ lower than $E_a$, and a third energy level $E_c$ lower than $E_b$; and
    the difference between said maser energy levels $E_k$ and $E_n$ is substantially equal to the difference between said conversion medium energy levels $E_b$ and $E_c$.

17. The arrangement defined in claim 15 wherein said modulation means further comprises:
    electric field generating means for generating an an electric field in regions containing said conversion medium;
    power supply means for powering said electric field generating means; and
    means for varying the power generated by said power supply means to thereby vary said electric field.

18. The arrangement defined in claim 15 wherein said modulation means further comprises:
magnetic field generating means for generating a magnetic field in regions containing said conversion medium;
power supply means for powering said magnetic field generating means; and
means for varying the power generated by said power supply means to thereby vary said magnetic field.

19. The arrangement defined in claim 15 wherein said conversion medium is selected from the class consisting of:
CO, NO, ClF, IF, BrF, HCl, HF, HBr, HI, ArF, KrF, XeF, RnF, ArCl, KrCl, XeCl, RnCl, XeI, RnI, $He_2^+$, $Ne_2^+$, $Ar_2^+$, $Kr_2^+$, $NF_3$, $Xe_2^+$, $Rn_2^+$, $H_2$, $N_2$, $O_2$, $Cl_2$, $Br_2$, $F_2$, $I_2$, $CO_2$, $CS_2$, COS, $H_2O$, $N_2O$, $NO_2$, $NH_3$, $BF_3$, $BCl_3$, $OsO_4$, $SF_6$, $MoF_6$, $WF_6$, $UF_6$, He, Ne, Ar, Kr, Xe, Rn, Li, Na, K, Rb, Cs, Mg, Ca, Sr, Cu, Ag, Au, Hg, Se, U, N, P, O, F, Cl, Br, Ni, Co, Cr, Nd, Dy, Tm, Pr, Sm, Eu, Yb, Ho, Neodymium-Yttrium-Aluminum-Garnet, Neodymium-Glass GaAs, GaSe, InSb, InP, InAs, PbSe, PbTe, GaSb, CdSe, CdS, Te, $GaAs_xP_{1-x}$, $GaIn_xP_{1-x}$, Bromoform, Tetrachloroethylene, Carbon Tetrachloride, Ethyl Iodide, Hexafluorobenzene, Carbon Disulfide, Chloroform, Dioxane, Nitromethane, Benzene, Chlorobenzene, Toluene, Fluorobenzene, Iodobenzene, Nitrobenzene, Quinoline, Furan, Styrene, Pentadiene, Isoprene, Acetonitrile, Methanol, Acetone, Ethanol, Dioxane, Cyclohexanol, P-Chlorotoluene, o-Xylene, Cyclohexane, 1-Fluoro 2-Chlorobenzene, Turpentine, Acetic Acid, Aniline, Water, Quartz, Lithium Niobate, α-Sulfur, Calcium Tungstate, Stilbene, Polystyrene, Calcite, Diamond, Naphthalene, Triglycine Sulphate, Oxygen ($O_2$), Potassium Vapor (K), Methane ($CH_4$), Deuterium ($D_2$), Hydrogen ($H_2$).

20. The arrangement defined in claim 19 wherein said emitter maser medium is selected from the class consisting of:
CO, NO, ClF, IF, Br, HCl, HF, HBr, HI, ArF, KrF, XeF, RnF, ArCl, KrCl, XeCl, RnCl, XeI, RnI, $He_2^+$, $Ne_2^+$, $Ar_2^+$, $Kr_2^+$, $NF_3$, $Xe_2^+$, $Rn_2^+$, $H_2$, $N_2$, $O_2$, $Cl_2$, $Br_2$, $F_2$, $I_2$, $CO_2$, $CS_2$, COS, $H_2O$, $N_2O$, $NO_2$, $NH_3$, $BF_3$, $BCl_3$, $OsO_4$, $SF_6$, $MoF_6$, $WF_6$, $UF_6$, He, Ne, Ar, Kr, Xe, Rn, Li, Na, K, Rb, Cs, Mg, Ca, Sr, Cu, Ag, Au, Hg, Se, U, N, P, O, F, Cl, Br, Ni, Co, Cr, Nd, Dy, Tm, Pr, Sm, Eu, Yb, Ho, Neodymium-Yttrium-Aluminum-Garnet, Neodymium-Glass GaAs, GaSe, InSb, InP, InAs, PbSe, PbTe, GaSb, CdSe, CdS, Te, $GaAs_xP_{1-x}$, and $GaIn_xP_{1-x}$.

21. The arrangement defined in claim 2 wherein said receiver means further comprises:
a pair of spaced apart aligned receiver resonator mirrors;
a receiver maser medium positioned intermediate said pair of resonator mirrors for generating receiver photons having a predetermined flux intensity, and a first of said pair of resonator mirrors reflecting substantially all of said receiver photons and the second of said pair of resonator mirrors having a predetermined transmission of said receiver photons; and
photon sensitive means connected to said demodulation means for detecting said receiver photons transmitted through said second of said pair of resonator mirrors.

22. The arrangement defined in claim 21 wherein said receiver means further comprises:
a conversion medium intermediate said pair of spaced apart receiver resonator mirrors and aligned therewith and in receiver photon receiving relationship to said receiver maser medium for receiving said neutrino-antineutrino beam and varying said flux intensity of said receiver photons in response thereto.

23. The arrangement defined in claim 22 wherein:
said receiver maser medium has a first energy level $E_k$ and a second energy level $E_n$ lower than $E_k$ and said receiver photons are generated between levels $E_k$ and $E_n$.

24. The arrangement defined in claim 23 wherein:
said conversion medium has a first energy level $E_a$, a second energy level $E_b$ lower than $E_a$ and a third energy level $E_c$ lower than $E_b$; and
the difference between said energy levels $E_k$ and $E_n$ of said receiver maser medium is substantially equal to the difference between said conversion medium energy levels $E_b$ and $E_c$.

25. The arrangement defined in claim 24 and further comprising:
pumping means for pumping said receiver maser medium to cause generation of said receiver photons therefrom.

26. The arrangement defined in claim 22 wherein said receiver maser medium is selected from the class consisting of:
CO, NO, ClF, IF, BrF, HCl, HF, HBr, HI, ArF, KrF, XeF, RnF, ArCl, KrCl, XeCl, RnCl, XeI, RnI, $He_2^+$, $Ne_2^+$, $Ar_2^+$, $Kr_2^+$, $NF_3$, $Xe_2^+$, $Rn_2^+$, $H_2$, $N_2$, $O_2$, $Cl_2$, $Br_2$, $F_2$, $I_2$, $CO_2$, $CS_2$, COS, $H_2O$, $N_2O$, $NO_2$, $NH_3$, $BF_3$, $BCl_3$, $OsO_4$, $SF_6$, $MoF_6$, $WF_6$, $UF_6$, He, Ne, Ar, Kr, Xe, Rn, Li, Na, K, Rb, Cs, Mg, Ca, Sr, Cu, Ag, Au, Hg, Se, U, N, P, O, F, Cl, Br, Ni, Co, Cr, Nd, Dy, Tm, Pr, Sm, Eu, Yb, Ho, Neodymium-Yttrium-Aluminum-Garnet, Neodymium-Glass GaAs, GaSe, InSb, InP, InAs, PbSe, PbTe, GaSb, CdSe, CdS, Te, $GaAs_xP_{1-x}$, and $GaIn_xP_{1-x}$.

27. The arrangement defined in claim 26 wherein said conversion medium is selected from the class consisting of:
CO, NO, ClF, IF, BrF, HCl, HF, HBr, HI, ArF, KrF, XeF, RnF, ArCl, KrCl, XeCl, RnCl, XeI, RnI, $He_2^+$, $Ne_2^+$, $Ar_2^+$, $Kr_2^+$, $NF_3$, $Xe_2^+$, $Rn_2^+$, $H_2$, $N_2$, $O_2$, $Cl_2$, $Br_2$, $F_2$, $I_2$, $CO_2$, $CS_2$, COS, $H_2O$, $N_2O$, $NO_2$, $NH_3$, $BF_3$, $BCl_3$, $OsO_4$, $SF_6$, $MoF_6$, $WF_6$, $UF_6$, He, Ne, Ar, Kr, Xe, Rn, Li, Na, K, Rb, Cs, Mg, Ca, Sr, Cu, Ag, Au, Hg, Se, U, N, P, O, F, Cl, Br, Ni, Co, Cr, Nd, Dy, Tm, Pr, Sm, Eu, Tb, Ho, Neodymium-Yttrium-Aluminum-Garnet, Neodymium-Glass GaAs, GaSe, InSb, InP, InAs, PbSe, PbTe, GaSb, CdSe, CdS, Te, $GaAs_xP_{1-x}$, $GaIn_xP_{1-x}$) Bromoform, Tetrachloroethylene, Carbon Tetrachloride, Ethyl Iodide, Hexafluorobenzene, Carbon Disulfide, Chloroform, Dioxane, Nitromethane, Benzene, Chlorobenzene, Toluene, Fluorobenzene, Iodobenzene, Nitrobenzene, Quinoline, Furan, Styrene, Pentadiene, Isoprene, Acetonitrile, Methanol, Acetone, Ethanol, Dioxane, Cyclohexanol, P-Chlorotoluene, o-Xylene, Cyclohexane, 1-Fluoro 2-Chlorobenzene, Turpentine, Acetic Acid, Aniline, Water, Quartz, Lithium Niobate, α-Sulfur, Calcium Tungstate, Stilbene, Polystyrene, Calcite, Diamond, Naphthalene, Triglycine Sulphate, Oxygen ($O_2$), Potassium Vapor (K), Methane ($CH_4$), Deuterium ($D_2$), Hydrogen ($H_2$).

28. The arrangement defined in claim 21 wherein:
said receiver maser medium is responsive to said neutrino-antineutrino beam and varies said flux intensity of said receiver photons in response thereto.

29. The arrangement defined in claim 21 wherein:
said receiver maser medium has a plurality of at least three energy levels, and said receiver maser medium emits pumping photons between a first and a second of said energy levels and said receiver photons are generated by the interaction of said pumping photons with said at least three energy levels.

30. The arrangement defined in claim 21 wherein: the lateral dimension of said receiver means is larger than the lateral dimension of said emitter means.

31. The arrangement defined in claim 21 wherein:
the path length of said receiver photons is folded in said receiver means.

32. The arrangement defined in claim 21 wherein said receiver maser medium is selected from the class consisting of:
CO, NO, ClF, IF, BrF, HCl, HF, HBr, HI, ArF, KrF, XeF, RnF, ArCl, KrCl, XeCl, RnCl, XeI, RnI, $He_2^+$, $Ne_2^+$, $Ar_2^+$, $Kr_2^+$, $NF_3$, $Xe_2^+$, $Rn_2^+$, $H_2$, $N_2$, $O_2$, $Cl_2$, $Br_2$, $F_2$, $I_2$, $CO_2$, $CS_2$, COS, $H_2O$, $N_2O$, $NO_2$, $NH_3$, $BF_3$, $BCl_3$, $OsO_4$, $SF_6$, $MoF_6$, $WF_6$, $UF_6$, He, Ne, Ar, Kr, Xe, Rn, Li, Na, K, Rb, Cs, Mg, Ca, Sr, Cu, Ag, Au, Hg, Se, U, N, P, O, F, Cl, Br, Ni, Co, Cr, Nd, Dy, Tm, Pr, Sm, Eu, Yb, Ho, Neodymium-Yttrium-Aluminum-Garnet, Neodymium-Glass GaAs, GaSe, InSb, InP, InAs, PbSe, PbTe, GaSb, CdSe, CdS, Te, $GaAs_xP_{1-x}$, and $GaIn_xP_{1-x}$.

33. The arrangement defined in claim 1 and further comprising:
a second emitter means for generating a second coherent neutrino-antineutrino beam in said first direction and adjacent said first emitter means;
emitter turntable means for supporting said first and said second emitter means for rotation about a first axis substantially perpendicular to said first direction;
a second receiver means aligned with said second emitter means and in neutrino-antineutrino beam receiving relationship therewith and mounted adjacent said first receiver means, for receiving said second neutrino-antineutrino beam and generating a second detectable output signal in response thereto;
receiver turntable means for supporting said first and said second receiver means for rotation about a second axis substantially perpendicular to said first direction; and
the frequency of the neutrino-antineutrino in said first neutrino-antineutrino beam is different from the frequency of the neutrino-antineutrinos in said second neutrino-antineutrino beam.

34. The arrangement defined in claim 1 and further comprising:
a second emitter means for emitting a second neutrino-antineutrino beam in a second direction substantially parallel to said first direction and mounted adjacent said first receiver means;
a second receiver means for receiving said second neutrino-antineutrino beam and generating a second detectable output signal in response thereto, and said second receiver means mounted adjacent said first emitter means.

35. The arrangement defined in claim 34 wherein:
said first neutrino-antineutrino beam is different from said second neutrino-autineutrino beam.

36. An improved coherent neutrino-antineutrino beam generating arrangement comprising, in combination:
a pair of spaced apart resonator mirrors;
an emitter maser medium intermediate said pair of spaced apart resonator mirrors and aligned to emit photons in a direction aligned with said pair of resonator mirrors;
modulation means coupled to said emitter maser medium for inducing the emission of a modulated, coherent beam of photons from said maser medium; and
said coherent photons having a first predetermined energy; and
a neutrino-antineutrino conversion medium for receiving said modulated beam of coherent photons and emitting a modulated coherent neutrino-antineutrino beam said neutrino-antineutrinos thereof having a second predetermined energy.

37. The arrangement defined in claim 36 wherein:
said modulation means further comprises means for moving at least one of said pair of resonator mirrors.

38. The arrangement defined in claim 36 wherein:
said maser medium and said neutrino-antineutrino beam conversion medium comprise the same medium.

39. The arrangement defined in claim 36 wherein:
said emitter maser medium and said neutrino-antineutrino beam conversion medium comprise different media and are positioned in a spaced apart relationship.

40. The arrangement defined in claim 36 wherein said conversion medium is selected from the class consisting of:
CO, NO, ClF, IF, BrF, HCl, HF, HBr, HI, ArF, KrF, XeF, RnF, ArCl, KrCl, XeCl, RnCl, XeI, RnI, $He_2^+$, $Ne_2^+$, $Ar_2^+$, $Kr_2^+$, $NF_3$, $Xe_2^+$, $Rn_2^+$, $H_2$, $N_2$, $O_2$, $Cl_2$, $Br_2$, $F_2$, $I_2$, $CO_2$, $CS_2$, COS, $H_2O$, $N_2O$, $NO_2$, $NH_3$, $BF_3$, $BCl_3$, $OsO_4$, $SF_6$, $MoF_6$, $WF_6$, $UF_6$, He, Ne, Ar, Kr, Xe, Rn, Li, Na, K, Rb, Cs, Mg, Ca, Sr, Cu, Ag, Au, Hg, Se, U, N, P, O, F, Cl, Br, Ni, Co, Cr, Nd, Dy, Tm, Pr, Sm, Eu, Yb, Ho, Neodymium-Yttrium-Aluminum-Garnet, Neodymium-Glass GaAs, GaSe, InSb, InP, InAs, PbSe, PbTe, GaSb, CdSe, CdS, Te, $GaAs_xP_{1-x}$, $GaIn_xP_{1-x}$, Bromoform, Tetrachloroethylene, Carbon Tetrachloride, Ethyl Iodide, Hexafluorobenzene, Carbon Disulfide, Chloroform, Dioxane, Nitromethane, Benzene, Chlorobenzene, Toluene, Fluorobenzene, Iodobenzene, Nitrobenzene, Quinoline, Furan, Styrene, Pentadiene, Isoprene, Acetonitrile, Methanol, Acetone, Ethanol, Dioxane, Cyclohexanol, P-Chlorotoluene, o-Xylene, Cyclohexane, 1-Fluoro 2-Chlorobenzene, Turpentine, Acetic Acid, Aniline, Water, Quartz, Lithium Niobate, α-Sulfur, Calcium Tungstate, Stilbene, Polystyrene, Calcite, Diamond, Naphthalene, Triglycine Sulphate, Oxygen ($O_2$), Potassium Vapor (K), Methane ($CH_4$), Deuterium ($D_2$), Hydrogen ($H_2$).

41. The arrangement defined in claim 36 wherein said emitter maser medium is selected from the class consisting of:

CO, NO, ClF, IF, BrF, HCl, HF, HBr, HI, ArF, KrF, XeF, RnF, ArCl, KrCl, XeCl, RnCl, XeI, RnI, $He_2^+$, $Ne_2^+$, $Ar_2^+$, $Kr_2^+$, $NF_3$, $Xe_2^+$, $Rn_2^+$, $H_2$, $N_2$, $O_2$, $Cl_2$, $Br_2$, $F_2$, $I_2$, $CO_2$, $CS_2$, COS, $H_2O$, $N_2O$, $NO_2$, $NH_3$, $BF_3$, $BCl_3$, $OsO_4$, $SF_6$, $MoF_6$, $WF_6$, $UF_6$, He, Ne, Ar, Kr, Xe, Rn, Li, Na, K, Rb, Cs, Mg, Ca, Sr, Cu, Ag, Au, Hg, Se, U, N, P, O, F, Cl, Br, Ni, Co, Cr, Nd, Dy, Tm, Pr, Sm, Eu, Yb, Ho, Neodymium-Yttrium-Aluminum-Garnet, Neodymium-Glass GaAs, GaSe, InSb, InP, InAs, PbSe, PbTe, GaSb, CdSe, CdS, Te, $GaAs_xP_{1-x}$, and $GaIn_xP_{1-x}$.

42. The arrangement defined in claim 41 wherein:

said conversion medium is selected from the class consisting of:

CO, NO, ClF, IF, BrF, HCl, HF, HBr, HI, ArF, KrF, XeF, RnF, ArCl, KrCl, XeCl, RnCl, XeI, RnI, $He_2^+$, $Ne_2^+$, $Ar_2^+$, $Kr_2^+$, $NF_3$, $Xe_2^+$, $Rn_2^+$, $H_2$, $N_2$, $O_2$, $Cl_2$, $Br_2$, $F_2$, $I_2$, $CO_2$, $CS_2$, COS, $H_2O$, $N_2O$, $NO_2$, $NH_3$, $BF_3$, $BCl_3$, $OsO_4$, $SF_6$, $MoF_6$, $WF_6$, $UF_6$, He, Ne, Ar, Kr, Xe, Rn, Li, Na, K, Rb, Cs, Mg, Ca, Sr, Cu, Ag, Au, Hg, Se, U, N, P, O, F, Cl, Br, Ni, Co, Cr, Nd, Dy, Tm, Pr, Sm, Eu, Yb, Ho, Ruby, Neodymium-Yttrium-Aluminum-Garnet, Neodymium-Glass GaAs, GaSe, InSb, InP, InAs, PbSe, PbTe, GaSb, CdSe, CdS, Te, $GaAs_xP_{1-x}$, $GaIn_xP_{1-x}$, Bromoform, Tetrachloroethylene, Carbon Tetrachloride, Ethyl Iodide, Hexafluorobenzene, Carbon Disulfide, Chloroform, Dioxane, Nitromethane, Benzene, Chlorobenzene, Toluene, Fluorobenzene, Iodobenzene, Nitrobenzene, Quinoline, Furan, Styrene, Pentadiene, Isoprene, Acetonitrile, Methanol, Acetone, Ethanol, Dioxane, Cyclohexanol, P-Chlorotoluene, O-Xylene, Cyclohexane, 1-Fluoro 2-Chlorobenzene, Turpentine, Acetic Acid, Aniline, Water, Quartz, Lithium Niobate, α-Sulfur, Calcium Tungstate, Stilbene, Polystyrene, Calcite, Diamond, Naphthalene, Triglycine Sulphate, Oxygen ($O_2$), Potassium Vapor (K), Methane ($CH_4$), Deuterium ($D_2$), Hydrogen ($H_2$).

43. The arrangement defined in claim 36 wherein said modulation means further comprises frequency modulation means.

44. The arrangement defined in claim 36 wherein said modulation means further comprises amplitude modulation means.

45. The arrangement defined in claim 36 wherein: said modulation comprises polarization modulation.

46. The arrangement defined in claim 36 wherein: said modulation means further comprises phase modulation.

47. The arrangement defined in claim 36 wherein said modulation means further comprises pulse duration modulation means.

48. The arrangement defined in claim 47 wherein said pulse duration modulation comprises one of pulse width modulation and pulse spacing modulation.

49. An improved neutrino-antineutrino beam receiver arrangement comprising in combination:

a pair of spaced apart aligned receiver resonator mirrors;

a receiver maser medium for generating receiver photons for reflection between said pair of resonator mirrors, and a first of said pair of resonator mirrors reflective for substantially all of said receiver photons and the second of said pair of resonator mirrors having a predetermined transmission for said receiver photons;

photon sensitive means adjacent said second resonator mirror for detecting said receiver photons transmitted through said second resonator means;

receiver conversion medium intermediate said pair of resonator mirrors for emitting receiver photons in said first direction in response to the passage of a neutrino-antineutrino beam therethrough; and output signal generating means coupled to said photon sensitive means for generating a detectable output signal in response to said detected receiver photons.

50. The arrangement defined in claim 49 wherein:

said neutrino-antineutrino beam is modulated to provide a predetermined information impressed thereon; and said output signal generating means further comprises demodulation means for modulating said detectable output signal in response to said modulation of said neutrino-antineutrino beam to provide said predetermined information therein.

51. The arrangement defined in claim 50 wherein:

said receiver conversion medium and said receiver maser medium comprise the same medium.

52. The arrangement defined in claim 50 wherein:

said receiver conversion medium and said receiver maser medium comprise different media.

53. The arrangement defined in claim 52 wherein:

said receiver conversion medium is spaced from said receiver maser medium and in receiver photon receiving relationship thereto.

54. A method of operating a communication system comprising the steps of:

generating a coherent neutrino-antineutrino beam;

receiving said coherent neutrino-antineutrino beam; and generating a detectable output signal in response to the reception of said coherent neutrino-antineutrino beam.

55. The method of claim 54 and further comprising the steps of:

modulating said coherent neutrino-antineutrino beam to impress predetermined information thereon; and demodulating said coherent neutrino-antineutrino beam to retrieve said information content;

generating said detectable output signal having said predetermined information content therein.

56. The method of claim 55 wherein the step of modulation further comprises modulating said coherent neutrino-antineutrino beam in one of amplitude modulation, phase modulation, pulse spacing modulation, pulse duration modulation, frequency modulation and polarization modulation modes.

* * * * *